(12) United States Patent
Chu et al.

(10) Patent No.: US 11,474,862 B2
(45) Date of Patent: Oct. 18, 2022

(54) SORTING ACTIVITY FEED NOTIFICATIONS TO ENHANCE TEAM EFFICIENCY

(71) Applicant: Citrix Systems, Inc., Fort Lauderdale, FL (US)

(72) Inventors: Xiaolu Chu, Nanjing (CN); Zongpeng Qiao, Nanjing (CN); Yuran Ou, Nanjing (CN); Tie Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 391 days.

(21) Appl. No.: 16/832,274

(22) Filed: Mar. 27, 2020

(65) Prior Publication Data
US 2021/0294647 A1 Sep. 23, 2021

Related U.S. Application Data

(63) Continuation of application No. PCT/CN2020/079689, filed on Mar. 17, 2020.

(51) Int. Cl.
*G06F 9/48* (2006.01)
*G06N 20/00* (2019.01)
(Continued)

(52) U.S. Cl.
CPC ............ *G06F 9/4881* (2013.01); *G06F 9/451* (2018.02); *G06N 5/04* (2013.01); *G06N 20/00* (2019.01); *G06F 2209/486* (2013.01)

(58) Field of Classification Search
CPC .......... G06N 20/00; G06N 5/04; G06F 9/542; G06F 9/451; G06F 9/4881; G06F 2209/486
(Continued)

(56) References Cited

U.S. PATENT DOCUMENTS

2014/0310047 A1   10/2014   De et al.
2019/0213509 A1*   7/2019   Burleson ............... G06N 20/00

FOREIGN PATENT DOCUMENTS

CN   103365708 A   10/2013
CN   105229626 A    1/2016
(Continued)

OTHER PUBLICATIONS

International Search Report and Written Opinion dated Dec. 16, 2020 in International Patent Application No. PCT/CN2020/079689.

*Primary Examiner* — John Q Chavis
(74) *Attorney, Agent, or Firm* — Pierce Atwood LLP

(57) ABSTRACT

A method, which may be performed by a computing system, involves determining that a plurality of notifications, including a first notification, is to be sent to a first client device, the first notification indicating a first task that is to be performed with respect to a resource accessible to the computing system; determining that a second task has a dependency relationship with the first task; determining at least one first parameter relating to the first task and at least one second parameter relating to the second task; determining, based at least in part on the at least one first parameter and the at least one second parameter, a first priority score corresponding to the first notification; and causing the plurality of notifications to be presented by the first client device in an order that is determined based at least in part on the first priority score.

20 Claims, 25 Drawing Sheets

(51) Int. Cl.
*G06F 9/451* (2018.01)
*G06N 5/04* (2006.01)

(58) Field of Classification Search
USPC .......................................................... 718/106
See application file for complete search history.

(56) References Cited

FOREIGN PATENT DOCUMENTS

| | | |
|---|---|---|
| CN | 108415778 A | 8/2018 |
| CN | 110704441 A | 1/2020 |
| WO | 2017084875 A1 | 5/2017 |

* cited by examiner

| User ID | Notification Group ID | Notification ID | Feature Vector | Assigned Score | Presentation Order | Handle Order | Adjusted Score |
|---|---|---|---|---|---|---|---|
| X | Y | A | {M} | 45 | 5 | 1 | 49 |
| X | Y | B | {N} | 30 | 8 | 8 | 30 |
| X | Y | C | {O} | 10 | 9 | 10 | 9 |
| X | Y | D | {P} | 88 | 1 | 5 | 84 |
| X | Y | E | {Q} | 6 | 10 | 9 | 7 |
| X | Y | F | {R} | 75 | 2 | 3 | 74 |
| X | Y | G | {S} | 60 | 3 | 2 | 61 |
| X | Y | H | {T} | 45 | 6 | 6 | 45 |
| X | Y | I | {U} | 59 | 4 | 4 | 59 |
| X | Y | J | {V} | 32 | 7 | 7 | 32 |

FIG. 9

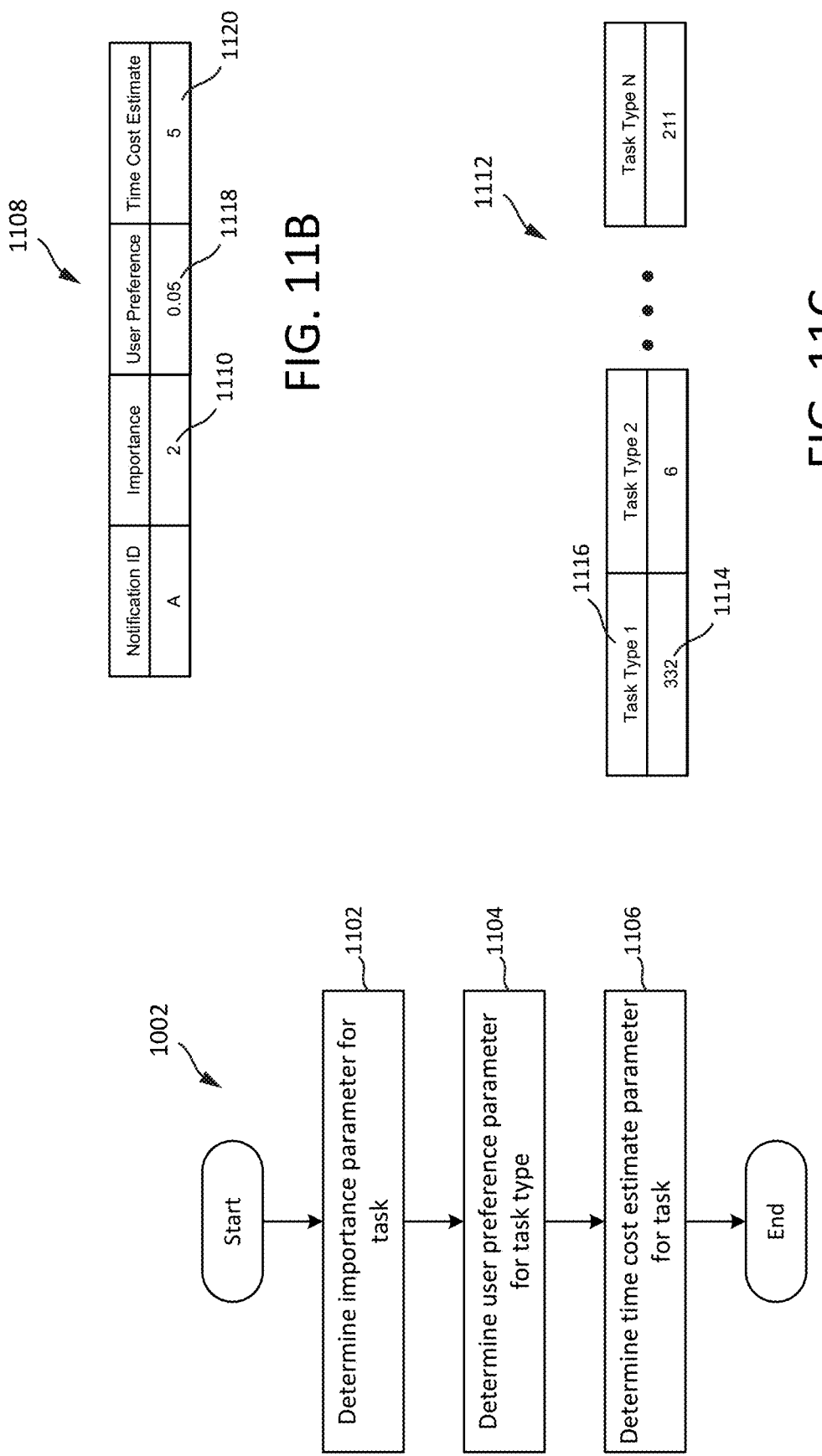

1202

| Notification ID | Task ID | User ID | Task Type | Duration | Weight |
|---|---|---|---|---|---|
| A | P | X | Simple A | 25 mins | 0.9 |
| B | Q | X | Simple B | 8 mins | 0.7 |
| C | R | X | Complex A | 33 mins | N/A |
| D | S | X | Complex B | 18 mins | N/A |
| ... | ... | ... | ... | ... | ... |
| N | T | X | Simple A | 35 mins | 1.3 |

| User ID | Task Type | Average Duration | Average Weight |
|---|---|---|---|
| X | Simple A | N/A | 1.2 |
| X | Simple B | N/A | 0.8 |
| X | Complex A | 33 mins | N/A |
| X | Complex B | 18 mins | N/A |

FIG. 12B

SORTING ACTIVITY FEED NOTIFICATIONS TO ENHANCE TEAM EFFICIENCY

CROSS-REFERENCE TO RELATED APPLICATIONS

This application is a continuation of and claims the benefit under 35 U.S.C. § 120 and 35 U.S.C. § 365(c) to International Application PCT/CN2020/079689, entitled SORTING ACTIVITY FEED NOTIFICATIONS TO ENHANCE TEAM EFFICIENCY, with an international filing date of Mar. 17, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is an intelligent activity feed for a user's many applications. Such an activity feed provides a streamlined mechanism for notifying a user of various application events in need of attention and allowing the user to efficiently act on such events, without requiring the user to switch context and separately launch the respective applications to take actions with respect to the different events.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining, by a computing system, that a plurality of notifications, including a first notification, is to be sent to a first client device, the first notification indicating a first task that is to be performed with respect to a resource accessible to the computing system. The computing system further determines that a second task has a dependency relationship with the first task, and determines at least one first parameter relating to the first task and at least one second parameter relating to the second task. Based at least in part on the at least one first parameter and the at least one second parameter, the computing system determines a first priority score corresponding to the first notification, and causes the plurality of notifications to be presented by the first client device in an order that is determined based at least in part on the first priority score.

In some of the disclosed embodiments, a system includes at least one processor and at least one computer-readable medium. The computer-readable medium is encoded with instructions which, when executed by the at least one processor, cause the system to determine that a plurality of notifications, including a first notification, is to be sent to a first client device, the first notification indicating a first task that is to be performed with respect to a resource accessible to the system; to determine that a second task has a dependency relationship with the first task; to determine at least one first parameter relating to the first task and at least one second parameter relating to the second task; to determine, based at least in part on the at least one first parameter and the at least one second parameter, a first priority score corresponding to the first notification; and to cause the plurality of notifications to be presented by the first client device in an order that is determined based at least in part on the first priority score.

In some of the disclosed embodiments, at least one non-transitory computer-readable medium is encoded with instructions which, when executed by at least one processor of a computing system, cause the computing system to determine that a plurality of notifications, including a first notification, is to be sent to a first client device, the first notification indicating a first task that is to be performed with respect to a resource accessible to the system; to determine that a second task has a dependency relationship with the first task; to determine at least one first parameter relating to the first task and at least one second parameter relating to the second task; to determine, based at least in part on the at least one first parameter and the at least one second parameter, a first priority score corresponding to the first notification; and to cause the plurality of notifications to be presented by the first client device in an order that is determined based at least in part on the first priority score.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 9 shows an illustrative example of a table that may be stored in the database(s) shown in FIG. 6 to enable retraining of the predictive model shown in FIG. 8;

FIG. 11A is a flow chart illustrating example steps that may be performed by the feature determination engine shown in FIG. 7 to implement the first step of the routine shown in FIG. 10;

FIG. 11B shows a table that includes examples of parameters that may be determined for a task pursuant to the routine shown in FIG. 11A;

FIG. 11C shows a table that includes examples of information that may be accumulated in the database(s) shown in FIG. 6 to implement the functionality of the second step shown in FIG. 11A in accordance with some embodiments;

FIG. 12A is a table that includes examples of data that may be recorded in the database(s) shown in FIG. 6 concerning respective tasks;

FIG. 12B is a table that includes examples of data that may be recorded in the database(s) shown in FIG. 6 concerning respective task types;

DETAILED DESCRIPTION

Figure 1A:
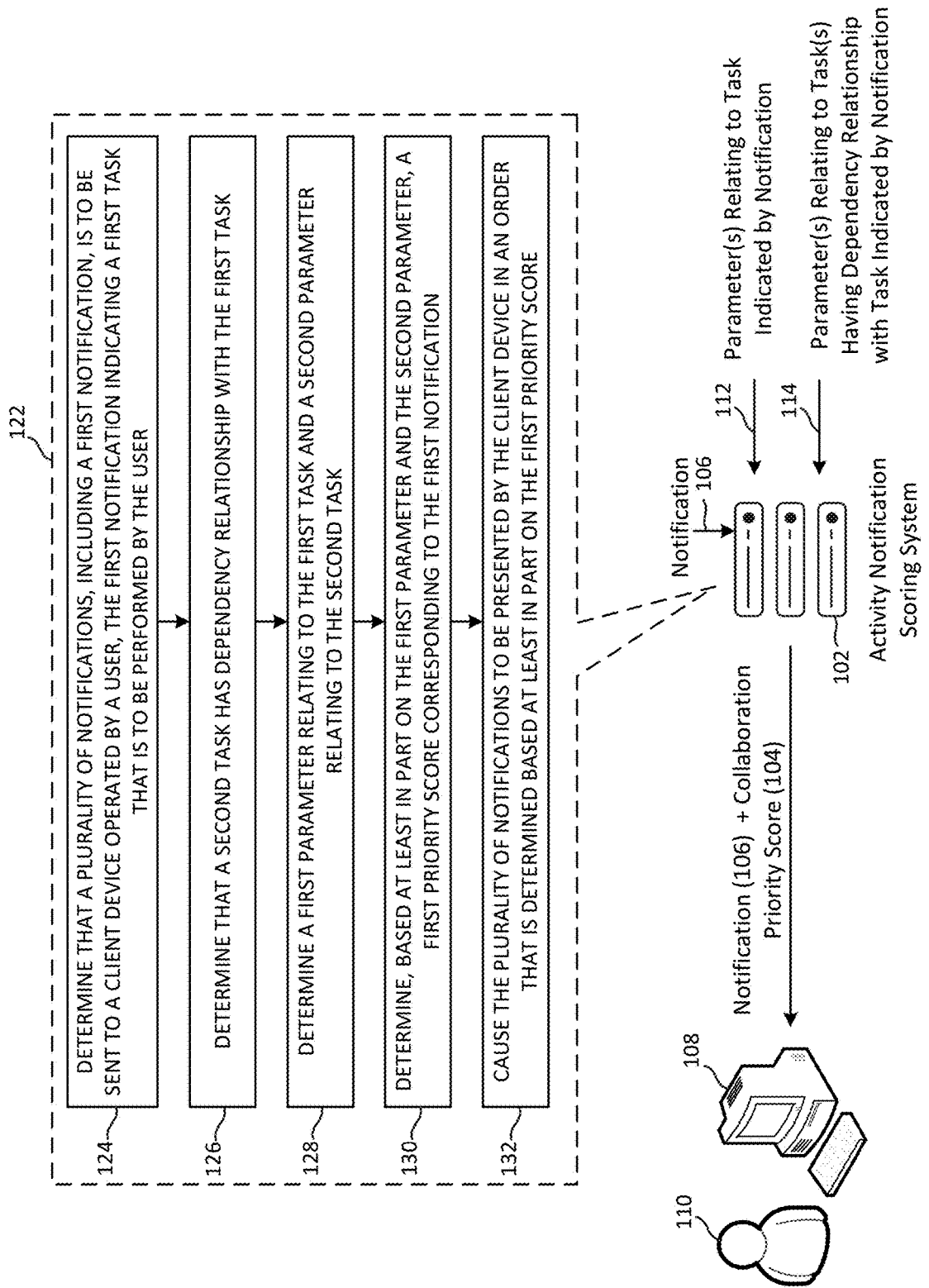
FIG. 1A is a diagram showing an example implementation of a system for sorting activity feed notifications to enhance team efficiency in accordance with some embodiments of the present disclosure.

For purposes of reading the description of the various embodiments below, the following descriptions of the sections of the specification and their respective contents may be helpful:

Section A provides an introduction to example systems and methods for sorting activity feed notifications to enhance team efficiency in accordance with some embodiments of the present disclosure;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by clients to a variety of resources;

Section F provides a more detailed description of the example systems and methods for sorting activity feed notifications to enhance team efficiency that were introduced above in Section A;

Section G describes example implementations of methods, systems/devices, and computer-readable media in accordance with the present disclosure.

A. Introduction to Illustrative Embodiments of Systems and Methods for Sorting Activity Feed Notifications To Enhance Team Efficiency An intelligent activity feed, such as that offered by the Citrix Workspace™ family of products, provides significant benefits, as it allows a user to respond to application-specific events generated by disparate systems of record without needing to navigate to, launch, and interface with each of several different native applications. An example of a system capable of providing such an activity feed is described in Section E below in connection with FIGS. 5A-D. In such a system, a remote computing system may be responsible for monitoring and interacting with various systems of record (e.g., software-as-a-service (SaaS) applications, web applications, Windows applications, Linux applications, desktops, file repositories and/or file sharing systems, etc.) on behalf of a user operating a client device. In particular, the remote computing system may detect the occurrence of an event relating to the user's account with a system of record, and may generate a notification about the detected event for inclusion in an activity feed that may be presented on the user's device, together with other notifications concerning other detected events relating to the user's other accounts with various systems of record. Such notification may indicate tasks that the user is to complete relating to the corresponding detected events. The notifications may further include one or more user interface elements that allow the user to interact with a microapp corresponding to a specific functionality of the system or record and/or launch a full application for the corresponding system of record to complete the indicated task.

The activity feed system described in Section E below is able to enhance an individual user's ability to effectively and efficiently interact with notifications in the activity feed by assigning priority scores to the respective notifications, which scores allow the notifications in the feed to be sorted for presentation to a user. Although such a notification scoring technique can provide significant advantages, the inventors have recognized and appreciated that it does not currently take into account how the performance of a given task represented in the activity feed might impact, or be impacted by, the performance other tasks within a common workflow. For example, for a given task to be performed by a user, the user might not be able to perform some aspect of the given task until another individual on the user's team has performed some aspect a preceding task in a workflow. Similarly, another individual on the user's team may not be able to perform some aspect of a succeeding task in the workflow until the user has performed some aspect the given task.

Offered is a system in which a score for a given notification to be provided to a user may be determined based not only on one or more factors relating to the specific task to which the notification corresponds but also on one or more factors relating to one or more other tasks that have a dependency relationship with the task under consideration. As used herein, a "dependency relationship" exists between first and second tasks when some aspect of the first task depends on some aspect of the second task, or vice-versa.

FIG. 1A illustrates, at a high level, how an activity notification scoring system 102 may be configured, in accordance with some embodiments of the present disclosure, to determine collaboration priority scores 104 for respective notifications 106 that are to be provided to a client device 108 operated by a user 110. As illustrated, the activity notification scoring system 102 may be configured to take into consideration, when determining a collaboration priority score 104 for a given notification 106, not only one or more parameters 112 relating to the task represented by the notification 106, but also one or more parameters 114 relating to those task(s), if any, that are determined to have a dependency relationship with the task represented by the notification 106 under consideration.

Figure 1B:
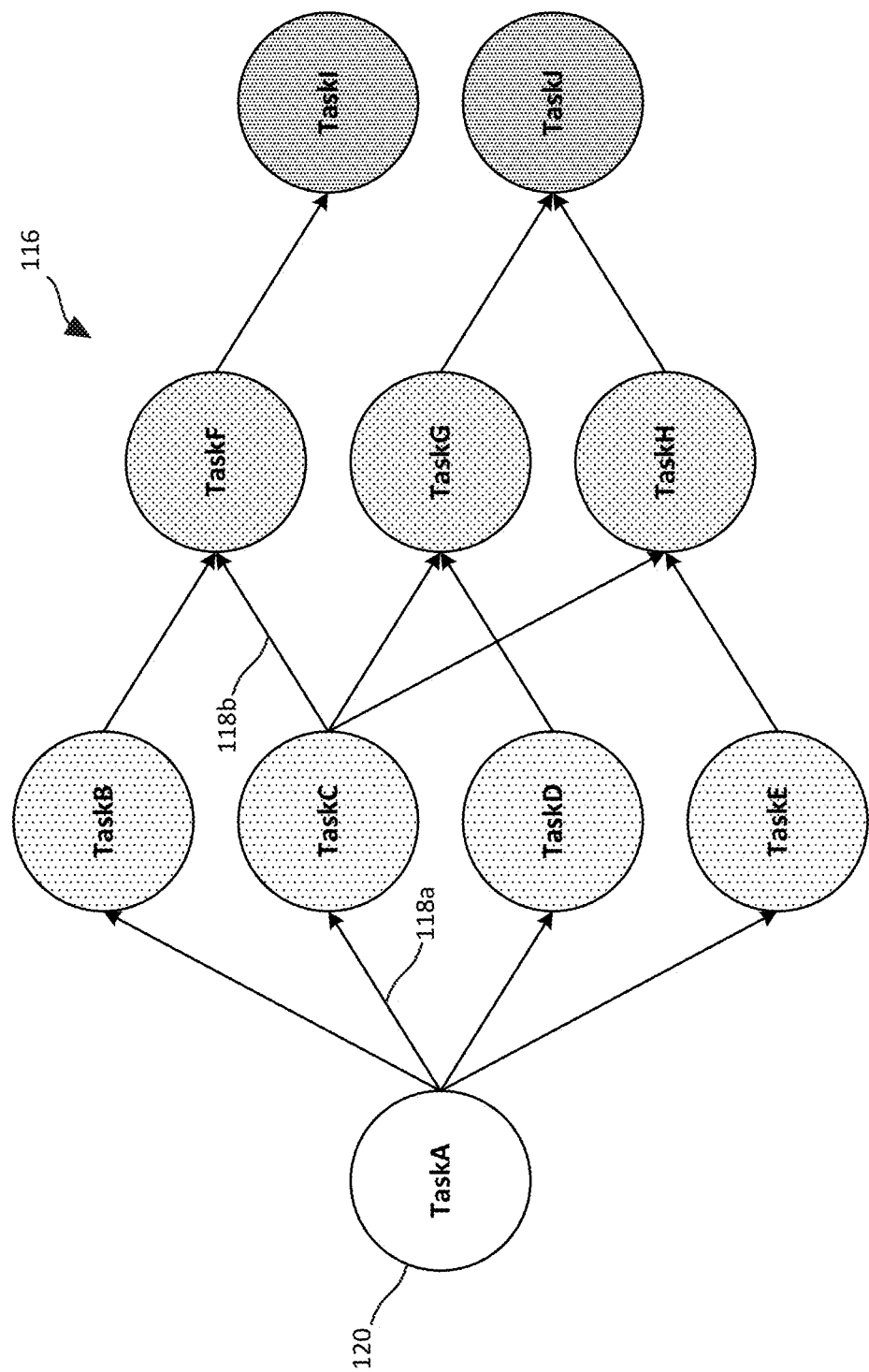
FIG. 1B shows an example of a directed graph that may represent dependency relationships amongst various tasks within a given workflow.

In some embodiments, the activity notification scoring system 102 may store or have access to a data structure or other information that indicates dependency relationships that exist between various tasks that can be represented by respective notifications 106. For example, in some implementations, such dependency relationships may be indicated by a data structure or other information that represents as a directed graph (or "digraph") in which respective tasks correspond to nodes in the digraph and dependency relationships correspond to directed edges, i.e., arrows, between such nodes. FIG. 1B shows an example of a digraph 116 that may represent dependency relationships (indicated by arrows 118) amongst various tasks (indicated by nodes 120) within a given workflow. In the digraph 116, the arrow 118a pointing from TaskA to TaskC indicates that TaskC is a "direct successor" of TaskA and also that TaskA is a "direct predecessor" of TaskC. Similarly, the arrow 118b pointing from TaskC to TaskF indicates that indicates that TaskF is a "direct successor" of TaskC and also that TaskC is a "direct predecessor" of TaskF. The combination of the arrow 118a pointing from TaskA to TaskC and the arrow 118b pointing from TaskC to TaskF indicates that TaskF is an "indirect successor" of TaskA, and that TaskA is an "indirect predecessor" of Task F. For any given task represented by the digraph 116, each other task that is either a predecessor task (direct or indirect) or a successor task (direct or indirect) is considered to have a dependency relationship with that given task. The digraph 116 indicates, for example, that TaskC has a dependency relationship with each of TaskA, TaskF, TaskG, TaskH, TaskI, and TaskJ.

Data structures or other information identifying the various tasks in respective workflows and the dependency relationships amongst such tasks may, for example, be obtained from providers of applications to which the tasks relate (e.g., SaaS companies, such as Workday, SAP, etc., enterprise software providers, etc.) and/or may be generated independently based on acquired knowledge about task workflows.

Referring again to FIG. 1A, as described in more detail below, the activity notification scoring system 102 may, in some embodiments, include a trained machine learning (ML) model, and the parameters 112, 114 provided to the activity notification scoring system 102 may be feature vectors that represent characteristics of a task for which a score is being generated as well as characteristics of any other tasks that are determined to have a dependency relationship with that to-be-scored task. As described in more detail below, the parameters 112 relating to the task under consideration may, for example, include factors such as (A) a determined importance level of the task (e.g., ranked 1-5, with 5 being the most important and 1 being the least important), (B) a "user preference" value representing a user's tendency to handle the type of task under consideration before handling other types of tasks, and (3) an estimated of amount of time the user will need to complete the task under consideration. As also described in more detail below, the parameters 114 relating to task(s) having dependency relationships with the task under consideration may, for example, include factors such as (A) the number of predecessor tasks for the task under of consideration, (B) the number of successor tasks for the task under consideration, (C) the number of other tasks that have any dependency relationship with the task under consideration, (D) a total amount of time other users have actually spent and/or are estimated to spend completing predecessor tasks, (E) a total amount of time other users have actually spent and/or are estimated to spend completing successor tasks, (F) a ratio between an amount of time the task under consideration has been awaiting action by the user and a total amount of time predecessor tasks have been awaiting action by other users, (G) a ratio between an amount of time the task under consideration has been awaiting action by the user and a total amount of time successor tasks have been awaiting action by other users, and (H) a ratio between an amount of time the task under consideration has been awaiting action by the user and a total amount of time predecessor and successor tasks have been awaiting action by other users. Example techniques for determining such values are described below in Section F.

In implementations in which the activity notification scoring system 102 employs a trained ML model, the trained ML model may generate collaboration priority scores 104 for respective notifications 106 based on such feature vectors. In other implementations, collaboration priority scores 104 for respective notifications 106 may be calculated using a suitable algorithm that otherwise determines values and/or applies weights based on the input parameters 112, 114. In any event, no matter how the collaboration priority scores 104 for respective notifications 106 are determined, the computing system that generates the notifications 106 and/or the client device 108 that receives the notifications 106 may use the determined collaboration priority scores 104 to cause the notifications 106 to be presented on the client device 108 in a ranked order that corresponds to a determined significance of the respective notifications 106 to the collective efficiency of a collaborative team. Presenting the notifications 106 to users in such a fashion may thus significantly decrease the total amount of time that a given group of workers, as a whole, needs to complete a given number of tasks.

The flowchart shown in FIG. 1A further illustrates an example routine 122 that may be performed by the activity notification scoring system 102 to determine collaboration priority scores 104 for respective notifications 106, and to cause such notifications 106 to be presented in an activity feed on the client device 108 in an order that depends on the determined scores.

As shown in FIG. 1A, the routine 122 may begin at a step 124 at which the activity notification scoring system 102 may determine a plurality of notifications 106 that are to be sent to the client device 108. As indicated, the plurality of notifications 106 may include a first notification which indicates a first task that is to be performed by the user 110. The first task may, for example, correspond to TaskC represented in the digraph 116 shown in FIG. 1B.

At a step 126 of the routine 122, the activity notification scoring system 102 may determine that a second task has a dependency relationship with the first task. In some implementations, the activity notification scoring system 102 may refer to a data structure corresponding to a digraph, such as the digraph 116, to make such a determination. For example, based on the digraph 116, the activity notification scoring system 102 may determine that TaskA (a second task) has a dependency relationship with TaskC. In such an example, the activity notification scoring system 102 may likewise determine that TaskF, TaskG, TaskH, TaskI, and TaskJ also have dependency relationships with TaskC.

At a step 128 of the routine 122, the activity notification scoring system 102 may determine a first parameter 112 relating to the first task (e.g., TaskC) and a second parameter 114 relating to the second task (e.g., TaskA). Several examples of suitable parameters that may be determined for such tasks are described below in Section F.

At a step 130 of the routine 122, the activity notification scoring system 102 may determine, based at least in part on the first parameter 112 and the second parameter 114, a first collaboration priority score 104 corresponding to the first notification 106. An example implementation in which a trained ML model is used to determine such a score is described below in Section F.

At a step 132 of the routine 122, the activity notification scoring system 102 may cause the plurality of notifications 106 to be presented by the client device 108 in an order that is determined based at least in part on the first collaboration priority score 104. In some implementations, the plurality of notifications 106 may, for example, be arranged in a ranked order (either by the activity notification scoring system 102 or by the client device 108) corresponding to collaboration priority scores 104 that are assigned to the respective notifications 106, and may be presented in such a ranked order on a display screen of the client device 108.

Although not depicted in FIG. 1A, it should be appreciated that, in some implementations, a user's interactions with the notifications 106 presented in the activity feed may further be evaluated to determine the manner and/or extent to which the user 110 interacts with the notifications 106 other than in the order in which they were ranked. As described below, in such implementations, such information may be used to determine a revised score that can be used, together with the parameters 112, 114, to retrain the ML model to improve the system's ability to present notifications 106 in an optimal order on future occasions.

Additional details and example implementations of embodiments of the present disclosure are set forth below in Section F, following a description of example systems and network environments in which such embodiments may be deployed.

B. Network Environment

Figure 2:
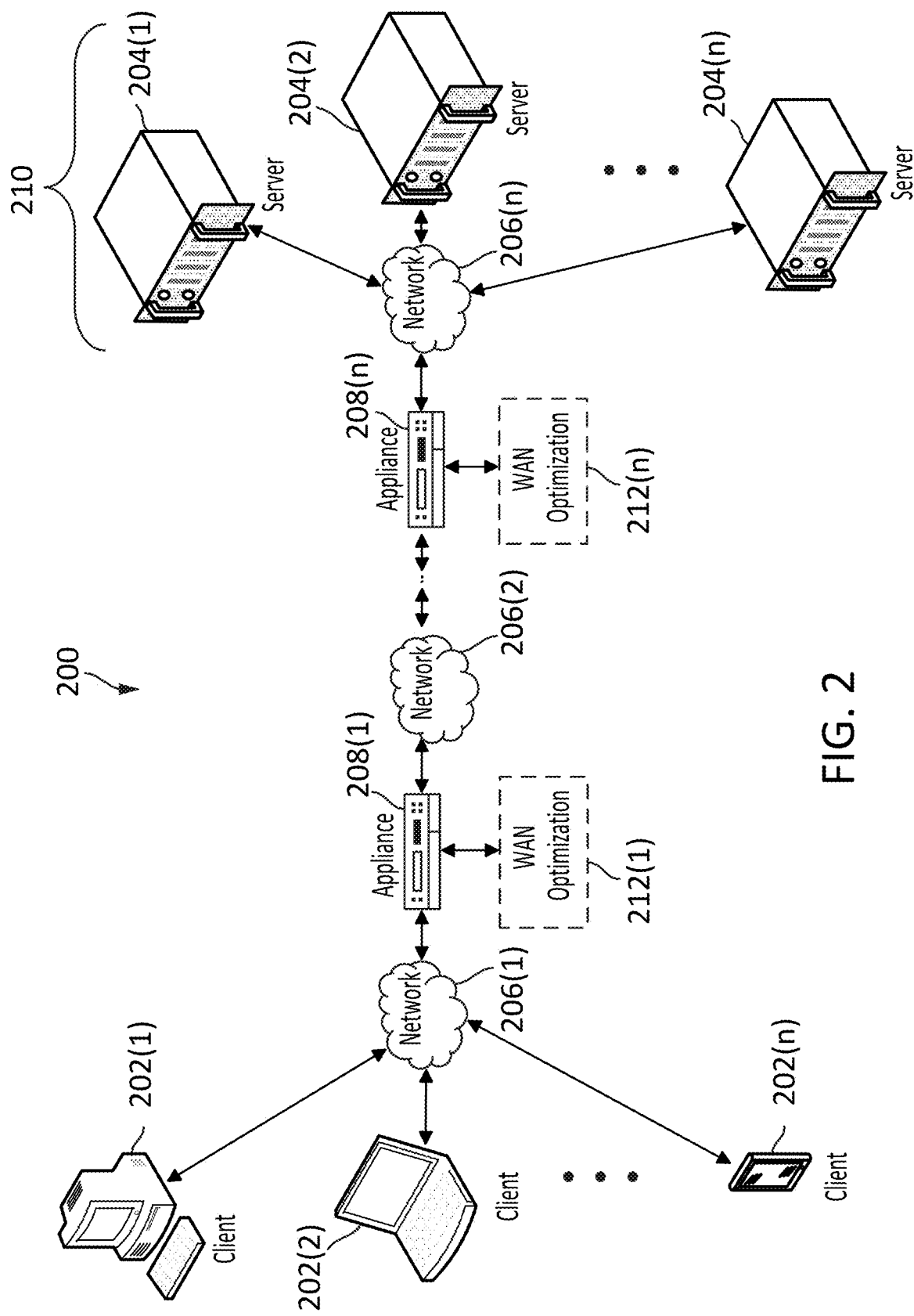
FIG. 2 is a diagram of a network environment in which some embodiments of the smart message sorting system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

C. Computing Environment

Figure 3:
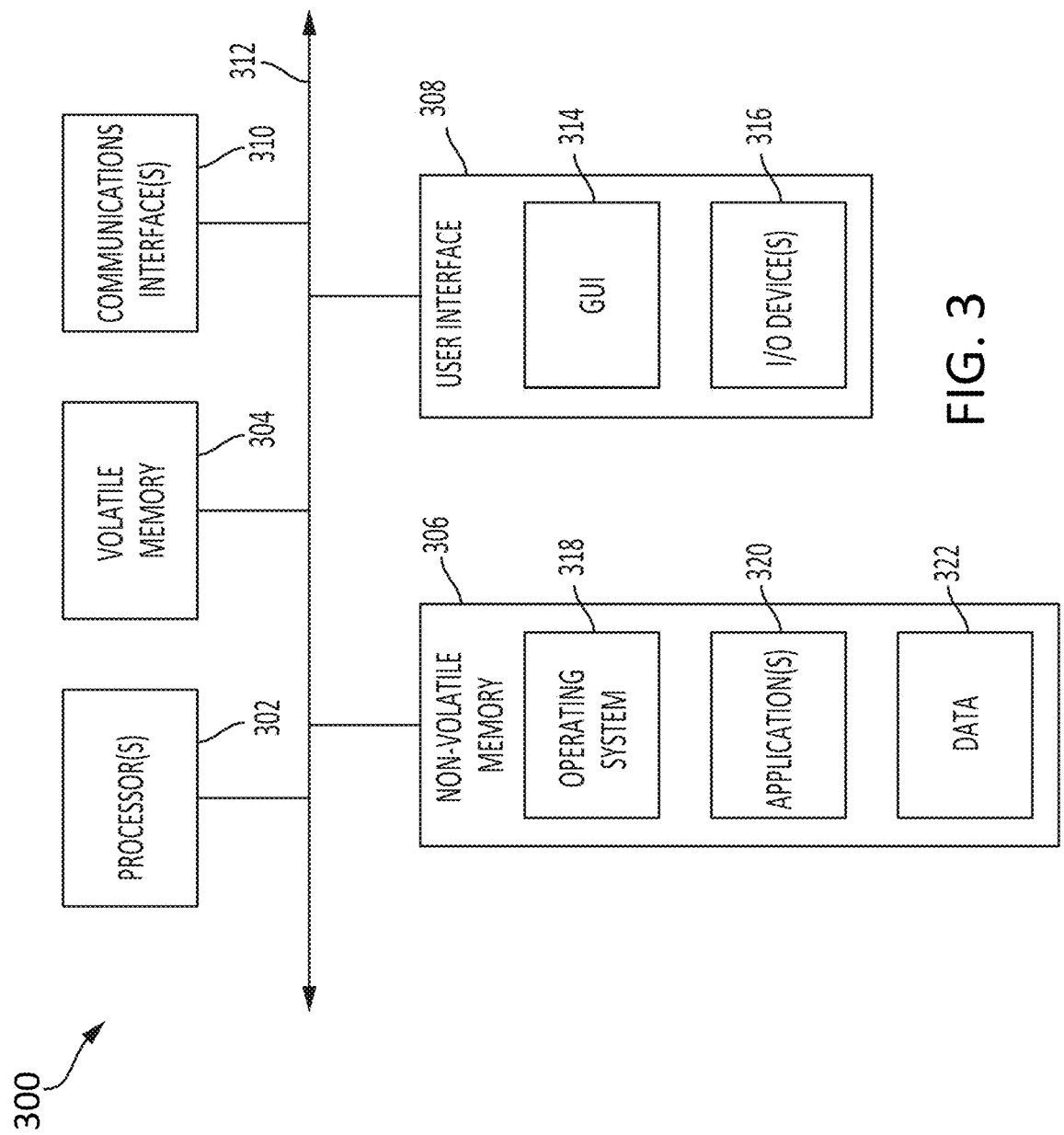
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
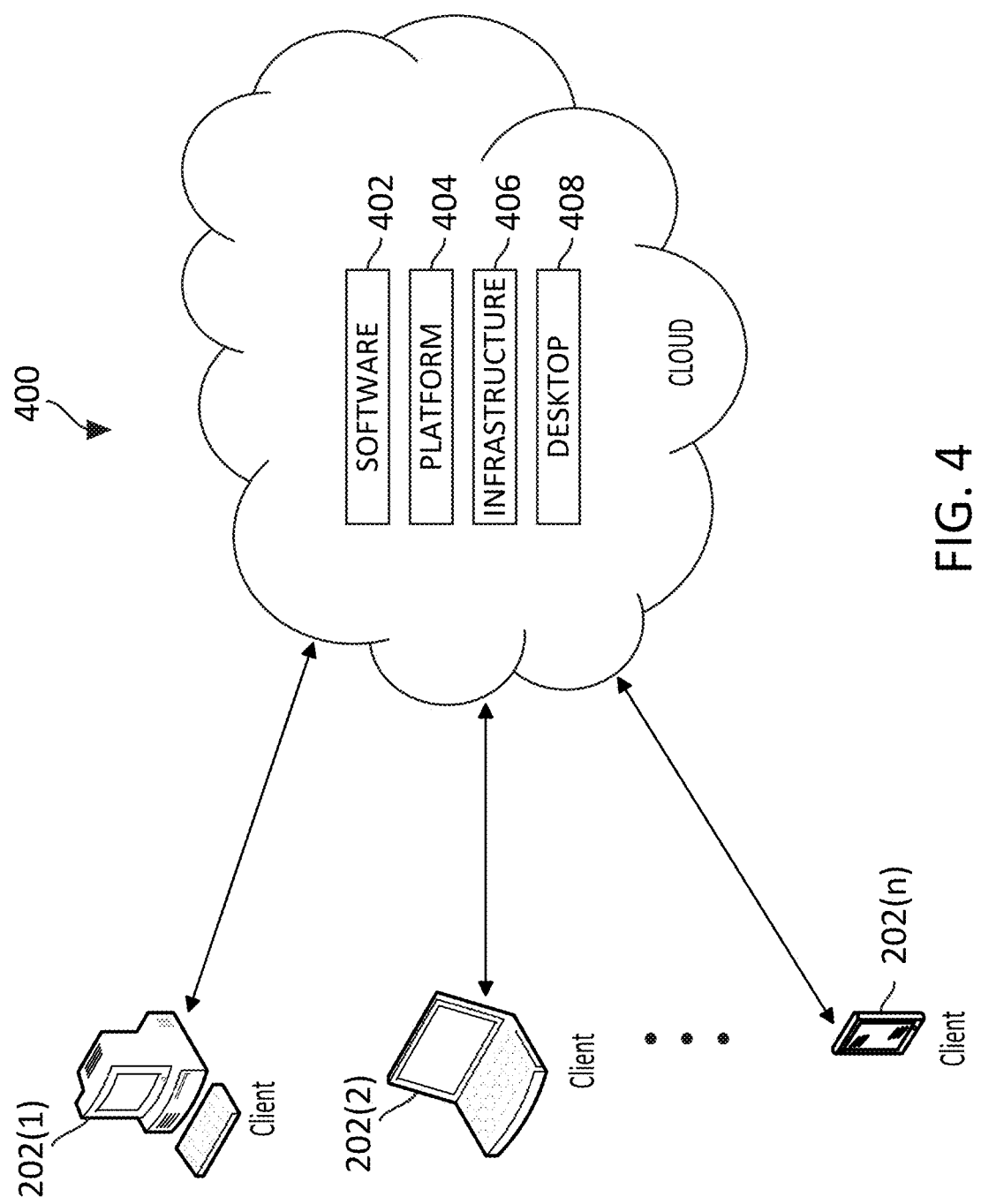
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, California, or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 5A:
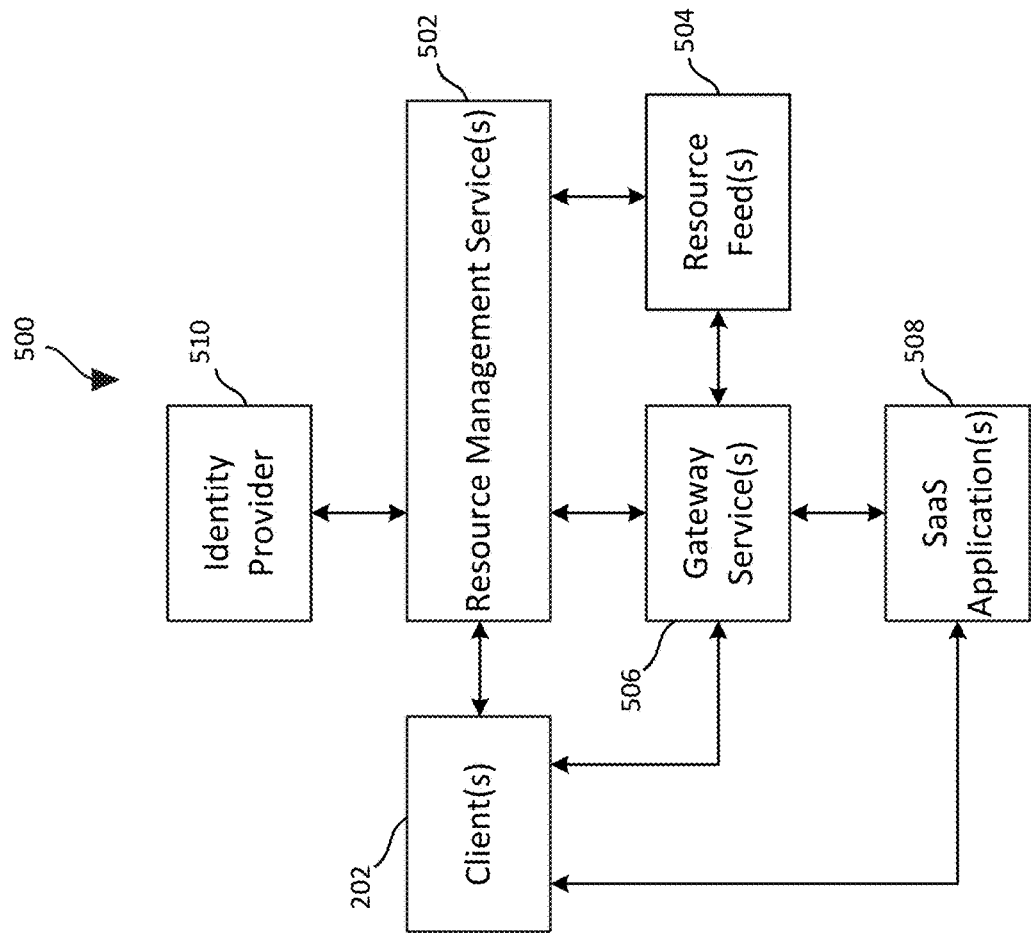
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the system 500 is deployed, within one or more cloud computing environments, or elsewhere.

Figure 5B:
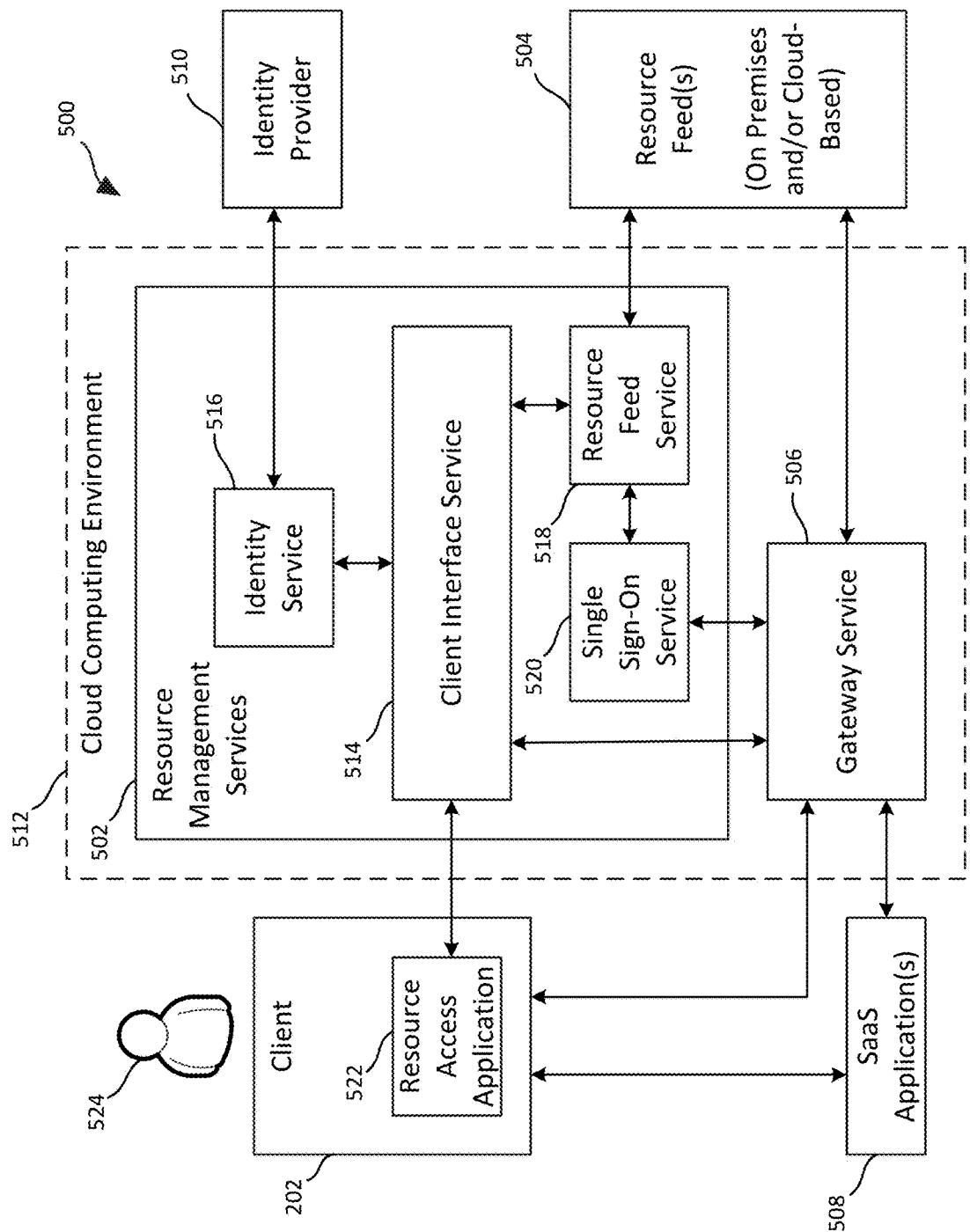
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances hosted in resource locations and may create a reverse proxy to route traffic between the site(s) and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
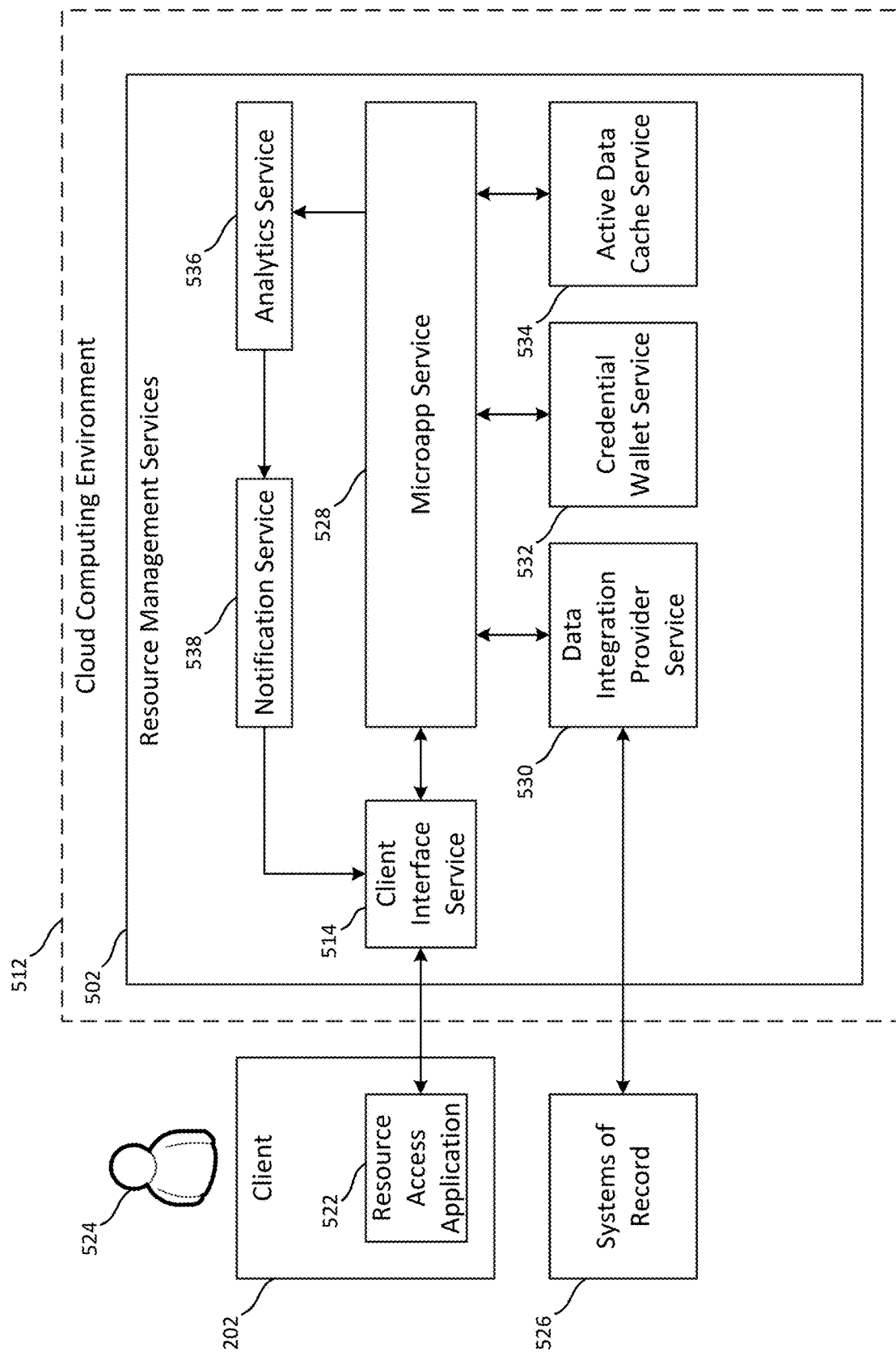
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a pertenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
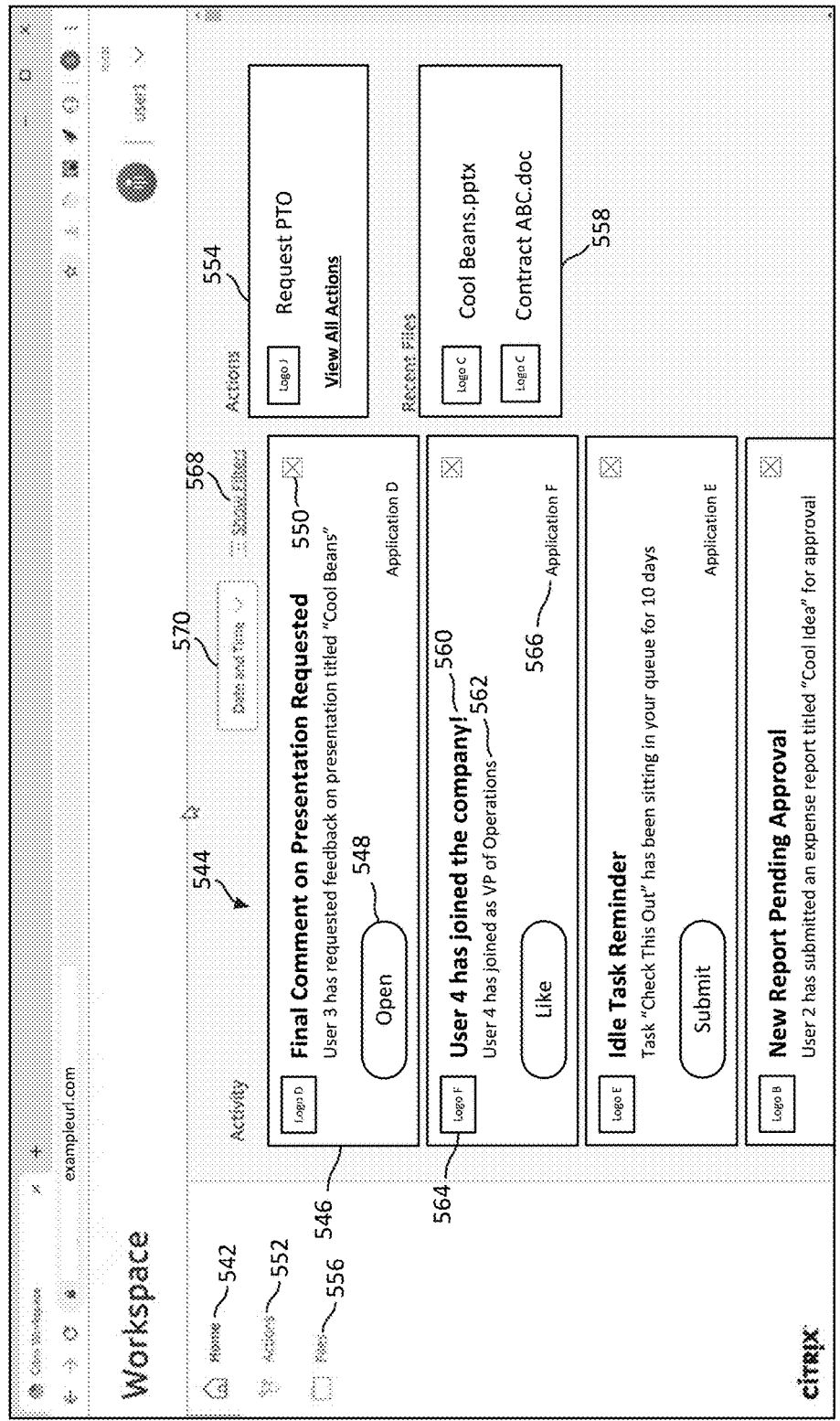
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D) and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of Systems and Methods for Sorting Activity Feed Notifications To Enhance Team Efficiency As discussed above in Section A, in some embodiments, an activity notification scoring system 102 (shown in FIG. 1A) may be configured to determine collaboration priority scores 104 for notifications 106 that are to be presented in an activity feed on a client device 108. Advantageously, as Section A notes, such collaboration priority scores 104 may be determined based not only on one or more factors relating to the specific task associated with the notification 106 but also on one or more factors relating to one or more other tasks that have a dependency relationship with that specific task. The activity feed that is presented via the client device 108 may be generated in any of a number of ways and the notifications 106 may take on any of numerous forms. For example, in some embodiments, the activity notification scoring system 102 may be included within, or operate in conjunction with, one or more of the components of the resource management services 502 shown in FIG. 5C. As explained above in connection with FIGS. 5C and 5D, in some implementations, the analytics service 536 may be responsible creating targeted scored notifications 546 and sending such notifications 546 to the notification service 538 for delivery to the client device 202. Accordingly, in some embodiments, the activity notification scoring system 102 described herein may be readily be incorporated into, or operate in conjunction with, the analytics service 536.

Figure 6:
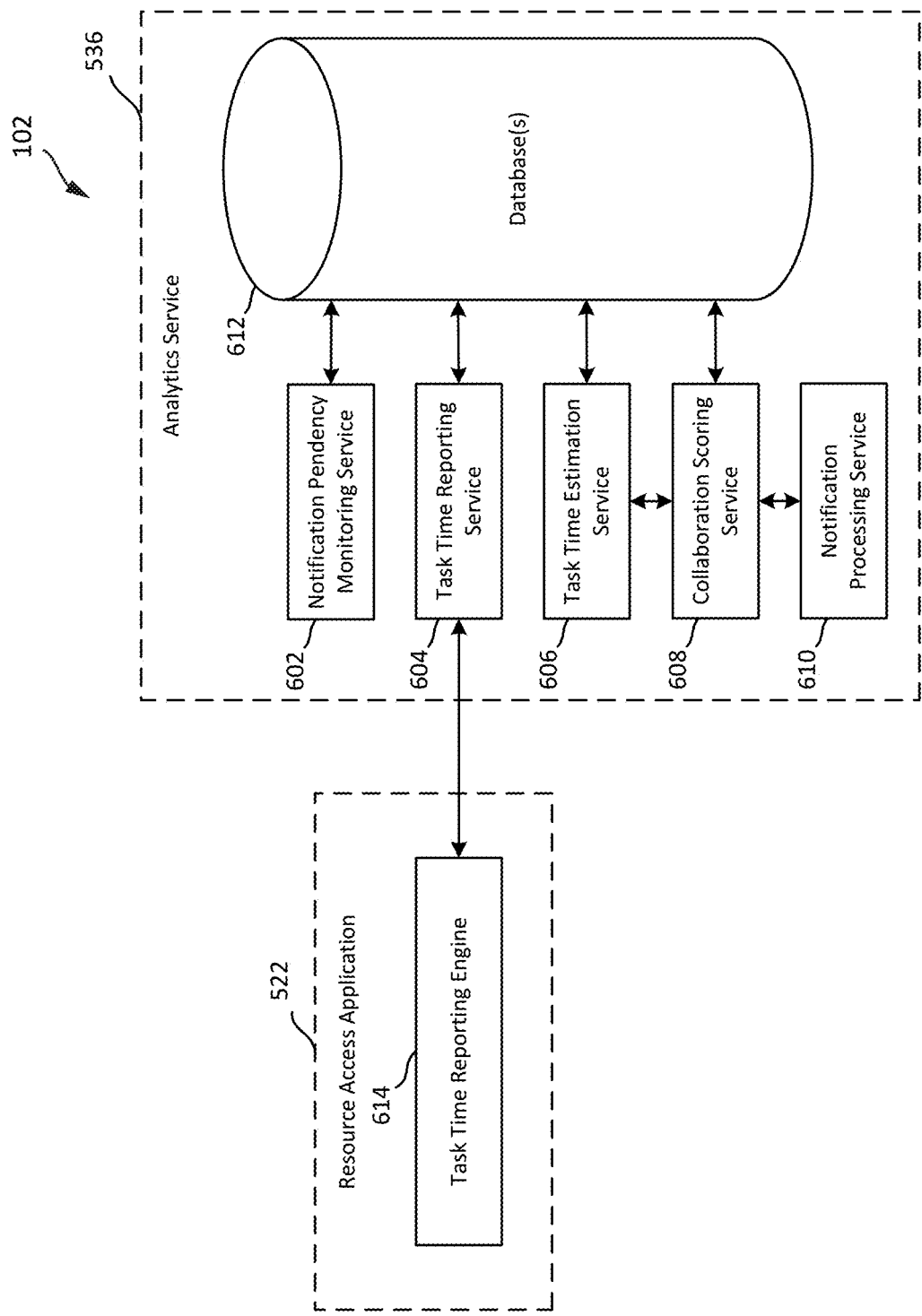
FIG. 6 is a block diagram illustrating example components that may be included within the analytics service and the resource access application shown in FIG. 5C to implement certain functionalities of the activity notification scoring system described herein in accordance with some embodiments.

FIG. 6 is a block diagram illustrating example components that may be included within the analytics service 536 and the resource access application 522, which are both described above in connection with FIG. 5C, to implement certain functionalities of the activity notification scoring system 102 described herein in accordance with some embodiments.

As shown, in some implementations, to implement the functionality of the activity notification scoring system 102, the analytics service 536 may include, in addition to or in lieu of the various other components which facilitate the functionality described above in Section E, a notification pendency monitoring service 602, a task time reporting service 604, a task time estimation service 606, a collaboration scoring service 608, a notification processing service 610, and one or more databases 612. In addition, in some implementations, to facilitate some of the functionality described herein, the resource access application 522 on the client device 108, 202 (or on a web server accessible to the client device 108, 202) may include a task time reporting engine 614. As described in more detail below, the collaboration scoring service 608 may form the core of the activity notification scoring system 102 by being the entity responsible for generating collaboration priority scores 104 that are to be associated with the notifications 106, 546. The collaboration scoring service 608 may, for example, generate collaboration priority scores 104 for notifications 106, 546 in response to requests from the notification processing service 610.

The remaining elements of the analytics service 536 shown in FIG. 6, i.e., the notification pendency monitoring service 602, the task time reporting service 604, and the task time estimation service 606, may collect and/or record information for the collaboration scoring service 608 to use in generating the collaboration priority scores 104. At a high level, the notification pendency monitoring service 602 may monitor and record times at which respective notifications 106, 546 are first created and/or first provided to the notification service 538 for delivery to client devices 108, 202, as well as times at which such notifications 106, 546 are cleared from a user's activity feed 544. Example implementations of the notification pendency monitoring service 602 are described below in connection with FIG. 21. The task time reporting service 604 may, at a high level, monitor and record information indicating amounts of time users actually spend responding to respective notifications 106, 546. As explained below in connection with FIGS. 13-15, the task time reporting service 604 may receive information concerning users' interactions with their activity feeds from task time reporting engines 614 of respective client devices 108, 202 for this purpose. Finally, at a high level, the task time estimation service 606 may use information accumulated and/or calculated by the task time reporting service 604 to provide estimates of amounts of time users are likely to spend responding to different types of notifications 106, 546. Example implementations of the task time estimation service 606 are described below in connection with FIGS. 16-18.

As noted above, in some implementations, the collaboration scoring service 608 shown in FIG. 6 may generate collaboration priority scores 104 in response to requests by the notification processing service 610. For example, in some implementations, the notification processing service 610 may request collaboration priority scores 104 from the collaboration scoring service 608 for one or more (or all) of a user's pending notifications 106, 546 each time a new notification 106, 546 is generated for the user. The notification processing service 610 may then provide such collaboration priority scores 104 to the notification service 538 (shown in FIG. 5C). The notification service 538 may either use the received collaboration priority scores 104 to determine an order in which the notifications 106, 546 are to be presented on a display of the client device 108, 202, or may provide the collaboration priority scores 104 to the resource access application 522, so that the resource access application 522 may sort the notifications 106, 546 it receives into an appropriate order based on the received collaboration priority scores 104. In some implementations, an option to sort the notifications 106, 546 based on determined collaboration priority scores 104 may be provided via the resource access application 522, e.g., using the user interface element 570 described above (in Section E) in connection with FIG. 5D. The user 110, 524 may, for example, indicate that the notifications 106, 546 are to be sorted based on the collaboration priority scores 104 by choosing a "Team Efficiency" sorting option from a drop-down menu or the like. In some implementations, an ability to cause notifications 106, 546 to be sorted based on determined collaboration priority scores 104 may be integrated into virtual assistant functionality, such as described above in connection with FIG. 5C (in Section E). In such implementations, a user may be able to cause notifications 106, 546 to be sorted based on the determined collaboration priority scores 104 by asking the virtual assistant to "show me tasks that don't block my team members," or by stating or typing another natural language query/command of like effect.

Figure 7:
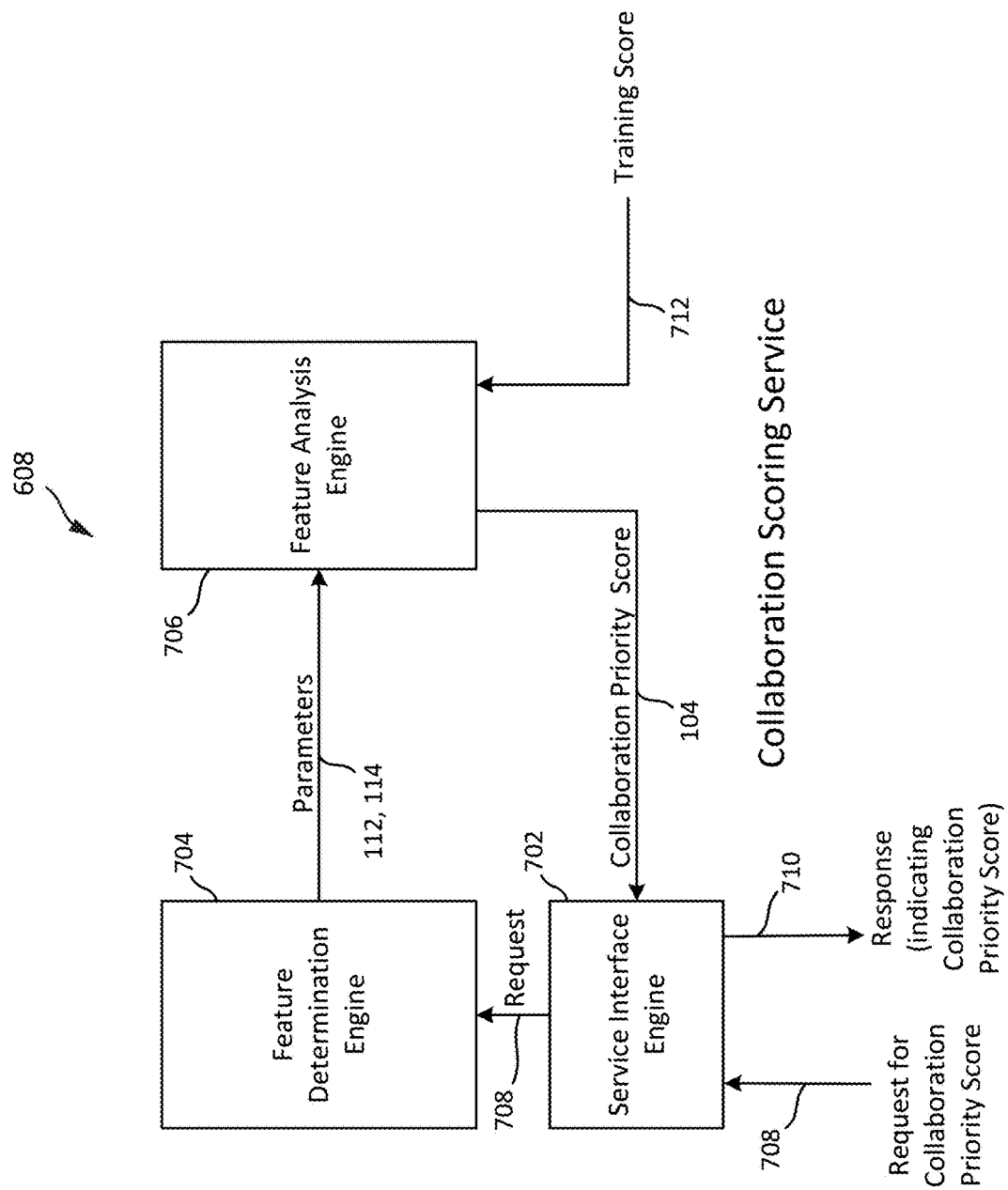
FIG. 7 is a block diagram illustrating an example implementation of the collaboration scoring service shown in FIG. 6.

As mentioned above, in some implementations, the collaboration scoring service 608 shown in FIG. 6 may form the core of the activity notification scoring system 102 by being the entity responsible for generating collaboration priority scores 104 that are to be associated with the notifications 106, 546. FIG. 7 is a block diagram illustrating an example implementation of the collaboration scoring service 608. As shown, the collaboration scoring service 608 may include a service interface engine 702, a feature determination engine 704, and a feature analysis engine 706.

The service interface engine 702 may be responsible for responding to requests 708 for collaboration priority scores 104 for respective notifications 106, 546. As noted above, in some implementations, such requests 708 may come from the notification processing service 610 shown in FIG. 6. In other implementations, the requests 708 may come from elsewhere. For example, such requests 708 for collaboration priority scores 104 may instead come from the resource access application 522 (e.g., via the client interface service 514) and/or from the notification service 538 shown in FIG. 5C.

As shown in FIG. 7, when the service interface engine 702 receives a request 708 for a collaboration priority score 104 for a notification 106, 546, it may pass that request 708 to the feature determination engine 704 for processing. As explained in detail below in connection with FIGS. 10-22, upon receiving a request 708, the feature determination engine 704 may query the database(s) 612 and/or the task time estimation service 606 for parameters 112, 114 (see FIG. 1A) relating to pertinent features of the notification 106, 546 for which the collaboration priority score 104 was requested as well pertinent features of one or more other notifications 106, 546 that have a dependency relationship with that notification. Examples of features that may be so identified and processed for determining parameters relating to such features are described below in connection with FIGS. 11A and 19A.

As FIG. 7 illustrates, the parameters 112, 114 determined by the feature determination engine 704 may be passed to the feature analysis engine 706 for processing. An example implementation of the feature analysis engine 706 (which employs a trained machine learning model) is described below in connection with FIG. 8. As shown in FIG. 7, the feature analysis engine 706 may determine a collaboration priority score 104 based on the received parameters 112, 114, and may send that collaboration priority score 104 to the service interface engine 702. The service interface engine 702 may then send a response 710 to the entity that sent the request 708. At illustrated, the response 710 may indicate the collaboration priority score 104 that was determined by the feature analysis engine 706. Further, as explained in more detail below in connection with FIG. 8, in some implementations, a training score 712 may be additionally be provided to the feature analysis engine 706 in certain circumstances to train and/or re-train a machine learning model or other algorithm that the feature analysis engine 706 uses to evaluate the parameters 112, 114 to determine the collaboration priority score 104.

Figure 8:
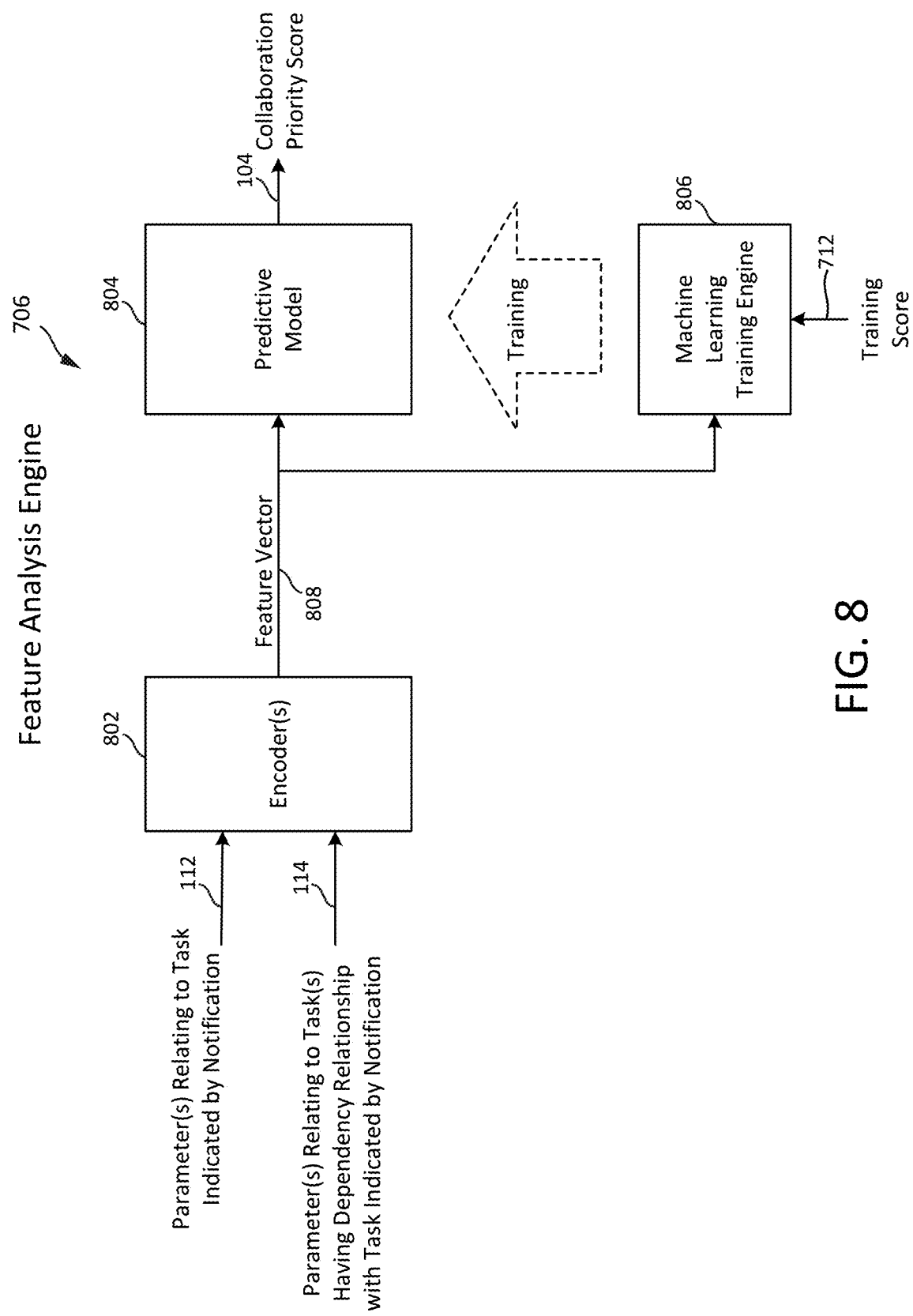
FIG. 8 is a block diagram showing an example implementation of the feature analysis engine shown in FIG. 7.

FIG. 8 is a block diagram showing an example implementation of the feature analysis engine 706 shown in FIG. 7. As shown, the feature analysis engine may, in some embodiments, include one or more encoders 802, a predictive model 804, and a machine learning training engine 806. In some implementations, the predictive model 804 may comprise a multi-classification model that may be trained, e.g., using a machine learning algorithm executed by the machine learning training engine 806, to classify a received feature vector 808 into one of a number of possible categories, which each such category corresponding to a possible collaboration priority score 104. For example, in some implementations, such a multi-classification model may classify each received feature vector 808 into one of one hundred categories, with each such category representing a respective collaboration priority score between one and one hundred. As illustrated, the encoder(s) 802 may encode the parameters 112, 114 received from the feature determination engine 704 into the feature vector 808 that is evaluated by the feature analysis engine 706.

As shown in FIG. 8, the predictive model 804 may be trained or re-trained by providing feature vectors 808 and corresponding training scores 712 to the machine learning training engine 806 and causing the machine learning engine 806 to execute its machine learning algorithm using that data. In some implementations, the predictive model 804 may be initially trained using a collected data set that includes feature vectors 808 (or the parameters 112, 114 used to generate such feature vectors 808) that have been tagged with corresponding training scores 712.

Further, in some implementations, the feature vectors 808 (or the parameters 112, 114 used to generate such feature vectors 808) that are used to generate collaboration priority scores 104 for respective users may be recorded, e.g., in the database(s) 612, together with the determined collaboration priority scores 104 for those feature vectors 808 (or parameters 112, 114), and that recorded data may subsequently be used to retrain the predictive model 804. For example, in some implementations, the order in which users handle given sets of notifications 546 in their activity feeds 544 may be compared with the order in which such notifications 106, 546 were presented the activity feeds 544 based on the determined collaboration priority scores 104 to determine discrepancies. Where such discrepancies are identified, the scores that were assigned to the previously recorded feature vectors 808 (or parameters 112, 114) may be adjusted using a formula, algorithm, etc., and the adjusted scores may then be used as a training score 712 that may be fed to the machine learning training engine 806 together with the corresponding recorded feature vector 808 (or parameters 112, 114) so as to retrain the predictive model 804.

FIG. 9 shows an illustrative example of a table 900 that may be stored in the database(s) 612 to enable retraining of the predictive model 804 as noted above. As shown, the table 900 may include entries 902 representing the features vectors 808 that are input to the predictive model together with entries 904 representing the collaboration priority scores 104 the predictive model 804 determined for those feature vectors 808. As indicated, for each user (e.g., represented by a user identifier (ID) (see entries 906), the collaboration scoring service 608 may identify groups of notifications 106, 546 that have been generated for the user and assign respective notification group IDs to the identified groups (see entries 908). In some implementations, for instance, each set of ten newly-generated notifications 106, 546 may be assigned a common notification group ID. For tracking purposes, each notification 106, 546 in the system may additionally be assigned a unique notification ID (see entries 910).

As shown, the table 900 may further includes entries 912 indicating a relative order in which the notifications 106, 546 in the indicated group were to be presented in the user's activity feed 544 based on the assigned collaboration priority scores 104 (per entries 906). In the example shown, the assigned scores (i.e., entries 906) are within a range of zero to one hundred and the higher scores correspond to a lower presentation order (i.e., an earlier position in the activity feed 544). In some implementations, the relative order of two notifications 106, 546 having the same collaboration priority score 104 may be determined based on some pre-determined criterion, such as the time in which such notifications were generated, e.g., with earlier-generated notifications appearing earlier in the presentation order. With respect to the presentation order, it should be appreciated that storage of the entries 912 in the table 900 is not strictly necessary, as the presentation order may be inferred based on the corresponding assigned scores (per entries 906) and perhaps other data, such as times at which respective notifications were generated, e.g., to determine the relative presentation order of notifications having the same assigned scores.

As shown in FIG. 9, the collaboration scoring service 608 may further record in the table 900 an order (see entries 914) in which the notifications 106, 546 in the indicated group were handled by the user relative to the other notifications 106, 546 in the same group. In some implementations, a given notification 104, 546 may be deemed "handled" when the user takes some action causes the notification 106, 546 to be removed from that user's activity feed 544.

Further, as also shown in FIG. 9, once all of the notifications 106, 546 in the indicated group have been handled by the user, the collaboration scoring service 608 may, based on the handle order data (i.e., entries 914) and possibly other data in the table 900, calculate and record adjusted scores (see entries 916) for the respective notifications 106, 546 in the indicated group. Such adjusted scores may be calculated in any of a number of ways and may take into account any number of factors in addition to the handle order (per entries 914). As one illustrative example, the adjusted scores may be calculated, as indicated in the table 900, by determining a difference between the presentation order rank and the handle order rank, and then adding that difference to the assigned score. For notification ID "A" in the table 900, for example, the adjusted score "49" may be calculated by adding to assigned score "45" the difference between the presentation order rank "5" and the handle order rank "1" (i.e., "49=45+(5−1)"). Similarly, for notification ID "C" in the table 900, for example, the adjusted score "9" may be calculated by adding to assigned score "10" the difference between the presentation order rank "9" and the handle order rank "10" (i.e., "9=10+(9−10)").

In any event, no matter how the adjusted scores (i.e., entries 916 in the table 900) are determined, as noted above, those adjusted scores may be fed (as training scores 712) to the machine learning training engine 806 together with the corresponding feature vectors (i.e., entries 902) recorded in the database(s) 612 to retrain the predictive model 804.

Figure 10:
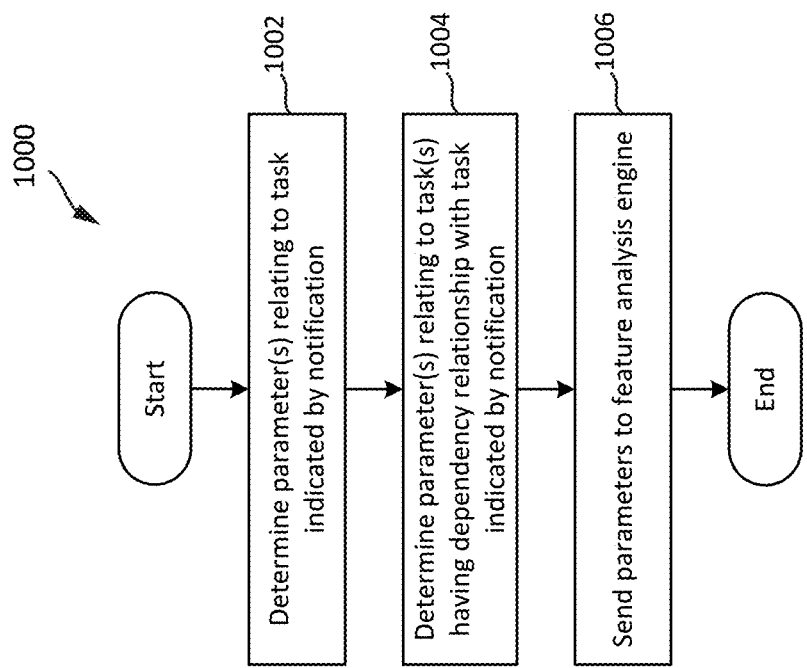
FIG. 10 is a flow chart illustrating an example routine that may executed by the feature determination engine shown in FIG. 7.

FIG. 10 is a flow chart illustrating a high-level routine 1000 that may be executed by the feature determination engine 704 shown in FIG. 7. The steps of the routine 1000, as well as the various sub-routines of the routine 1000 described herein, may, in some embodiments, be performed by one or more computing systems, such as that described above in connection with FIG. 3. In particular, in some implementations, one or more computer-readable media may be encoded with instructions which, when executed by one or more processors, may cause the computing system to perform the indicated functionality. The other functionality described herein may likewise be implemented by one or more such computing systems in a similar manner in some embodiments.

As shown, the routine 1000 may include steps 1002 and 1004 at which the feature determination engine 704 may determine the parameters 112 and the parameters 114, respectively. As also shown, the routine 1000 may additionally include a step 1006 at which the feature determination engine 704 may send the determined parameters 112, 114 to the feature analysis engine 706 for processing. As indicated, the parameters 112 determined at the step 1002 relate to the task that is indicated by the notification 106, 546 for which a collaboration priority score 104 has been requested, and the parameters 114 determined at the step 1004 relate to one or more tasks that have a dependency relationship with the task indicated by that notification. Examples implementations of the steps 1002 and 1004 are described below in connection with FIGS. 11A and 19A, respectively.

FIG. 11A is a flow chart illustrating example steps 1102, 1104, 1106 that may be performed by the feature determination engine 704 to implement the step/routine 1002 shown in FIG. 10, i.e., to determine the parameters 112 relating to the particular task that is indicated by a notification 106, 546 for which a collaboration priority score 104 has been requested. FIG. 11B shows a table 1108 that includes examples of parameters 112 that may be determined for the indicated task (which corresponds to notification "A" in the illustrated example) by the feature determination engine 704 pursuant to the steps 1102, 1104 and 1106. FIG. 11C shows a table 1112 that includes examples of information that may be accumulated in the database(s) 612 to implement the functionality of the step 1104 in accordance with some embodiments. The data in the table 1112 shown in FIG. 11C and the manner in which that data may be used in connection with the step 1104 is described further below.

As shown in FIG. 11A, at the step 1102 of the routine 1002, the feature determination engine 704 may determine an importance parameter 1110 (see FIG. 11B) for the indicated task, e.g., the task corresponding to the notification "A." In some implementations, the importance parameter 1110 for the task may be determined by querying the system of record 526 to which the task relates, e.g., via the data integration service provider 530 shown in FIG. 5C, to determine a priority level or the like that the system of record 526 has assigned to the task. For example, the queried system of record 526 may return a textual indicator of a priority level of the task, such as "blocker," "critical," "major," "minor," or "trivial." In some implementations, the text string of such an indicator may mapped to a numerical value, such as a number between one and five, and the numerical value corresponding to the returned textual indicator may be identified as the importance parameter 1110 that is to be included in the parameters 112 that the feature determination engine 704 provides to the feature analysis engine 706. In other implementations, nodes in a digraph representing a workflow in which the indicated task is included, such as the digraph 116 shown in FIG. 1B, may have importance parameters assigned to them, and such values may be identified for use as the importance parameter 1110 determined at the step 1102. In some implementations, the importance parameters for respective notifications 106, 546 may be determined at the time such notifications 106, 546 are generated, and such parameters may be stored in the database(s) 612, as an additional entry in the table 900 shown in FIG. 9 or otherwise, for subsequent reference by the feature determination engine 704 pursuant to the step 1102. In any event, as a result of the step 1102, the importance parameter 1110 may be determined for the task that corresponds to the notification being evaluated.

At the step 1104 of the routine 1002 shown in FIG. 11A, the feature determination engine 704 may determine a user preference parameter 1118 (see FIG. 11B) for the type of task that is indicated by the notification 106, 546 for which a collaboration priority score 104 has been requested. In some implementations, a number of task "types" may be designated, and data may be stored in association with respective notifications 106, 546 that are generated, as an additional entry in the table 900 shown in FIG. 9 or otherwise, that indicates the types of tasks that are indicated by such notifications. Any of a number of metrics may be used as the user preference parameter 1118 and such metrics may be calculated in any of a number of ways. In some embodiments, for example, the user preference parameter 1118 may indicate a frequency with which a user has historically opted to handle the type of task at issue prior to handling other types of tasks that are simultaneously presented in the user's activity feed 544. In some implementations, for instance, respective count values may be maintained for the various task types that have been designated, and any time a user clears a particular type of notification 106, 546 from the user's activity feed 544 at a time when more than a threshold number of notifications 106, 546, e.g., ten notifications, are present in the feed, the count value for that type of notification may be incremented by one. Table 1112 shown in FIG. 11C illustrates how respective count values 1114 may be maintained for various task types 1116 in some implementations. In such implementations, the user preference parameter 1118 may be calculated, for example, as a ratio of the current count for the type of the notification being evaluated to the sum of the current counts for all of the notification types monitored by the system. For example, with reference to the table 1112, if the task corresponding to the notification 106, 546 being evaluated is of the type "1," then a user preference value for a task of the type "1" may be calculated to be "332/(332+6 . . . +221)." In any event, as a result of the step 1104, the feature determination engine 704 may determine a user preference parameter 1118 using the above-described formula or otherwise, for the notification 106, 546 being evaluated.

At the step 1106 of the routine 1002 shown in FIG. 11A, the feature determination engine 704 may determine a "time cost estimate" parameter 1120 (see FIG. 11B) for the notification 106, 546 for which a collaboration priority score 104 has been requested. The time cost estimate parameter 1120 may, for example, represent an estimate of the number of minutes (or other time unit of time) that a user will need to spend to complete the task corresponding to the notification 106, 546 being evaluated. In some embodiments, the feature determination engine 704 may send a request to the task time estimation service 606 for a time cost estimate for the notification 106, 546 being evaluated, and the task time estimation service 606 may return a time cost estimate in response to such a request. The feature determination engine 704 may then use the returned time cost estimate as the time cost estimate parameter 1120 (see FIG. 11B) that is sent to the feature analysis engine 706 as one of the parameters 112. The manner in which such time cost estimates may be determined in some implementations will now be described with reference to FIGS. 12-18.

As noted above in connection with FIG. 6, in some embodiments, the task time reporting service 604 may cooperate with task time reporting engines 614 associated with client devices 108, 202 to monitor and record information indicating amounts of time users actually spend responding to respective notifications 106, 546. As described in detail below in connection with FIGS. 13-15, the task time reporting engine 614 may, for example, monitor the beginning and ending of user interactions with microapps that are associated with notifications 106, 546, and the task time reporting service 604 may use information received from the task time reporting engine 614 to determine metrics relating to time spent interacting with the microapps. The task time reporting service 604 may then record such metrics in the database(s) 612. Examples of such metrics are reflected in the tables 1202 and 1204 shown in FIGS. 12A and 12B, respectively, which are described further below. Further, as explained in detail in connection with FIGS. 16-18, the feature determination engine 704 shown in FIG. 7 may request task time estimates from the task time estimation service 606, and the task time estimation service 606 may determine appropriate task time estimates based on the metrics that were recorded in the database(s) 612 by the task time reporting service 604.

Figure 13:
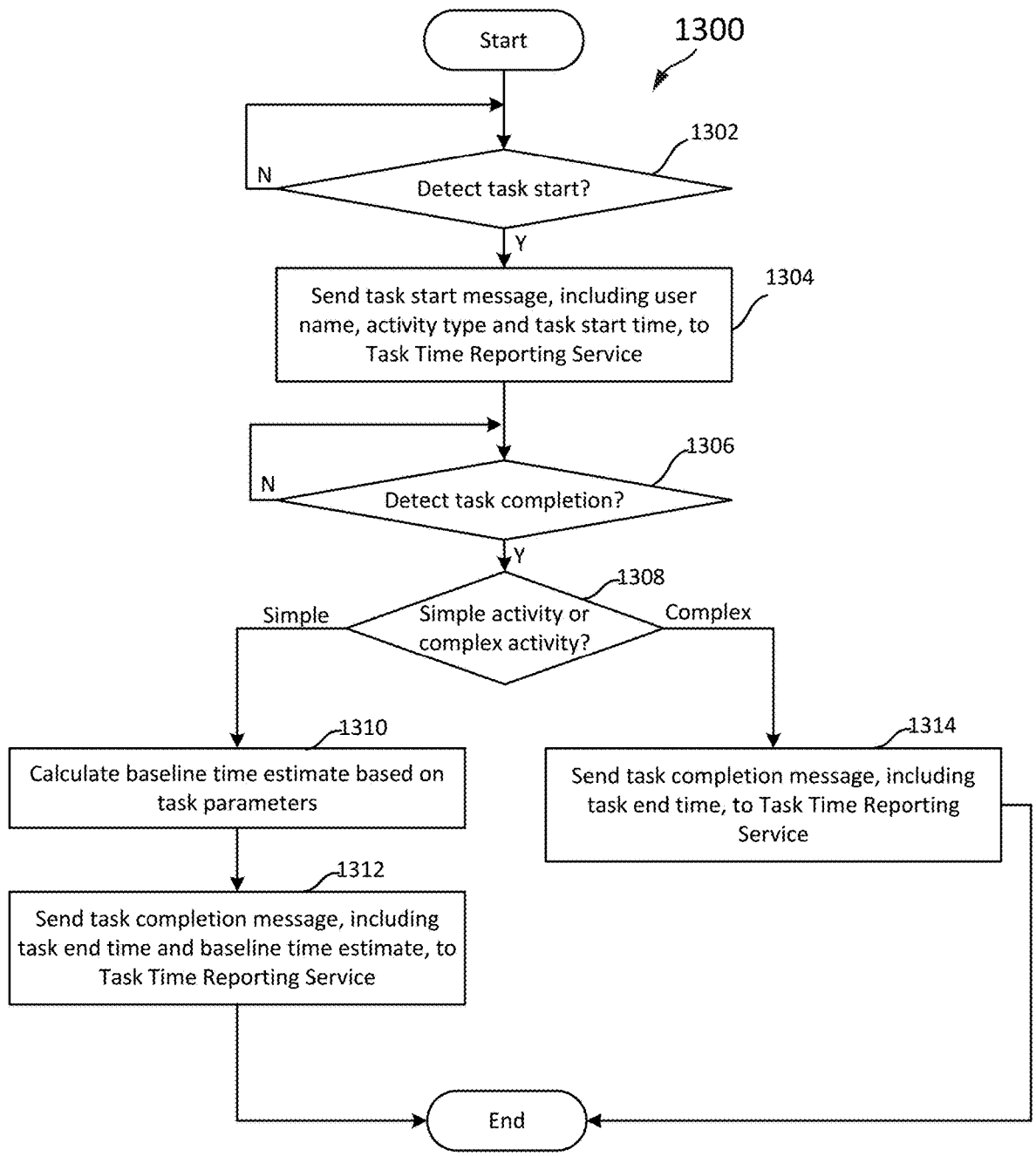
FIG. 13 is a flowchart showing an example routine that may be performed by the task time reporting engine shown in FIG. 6.
Figure 14:
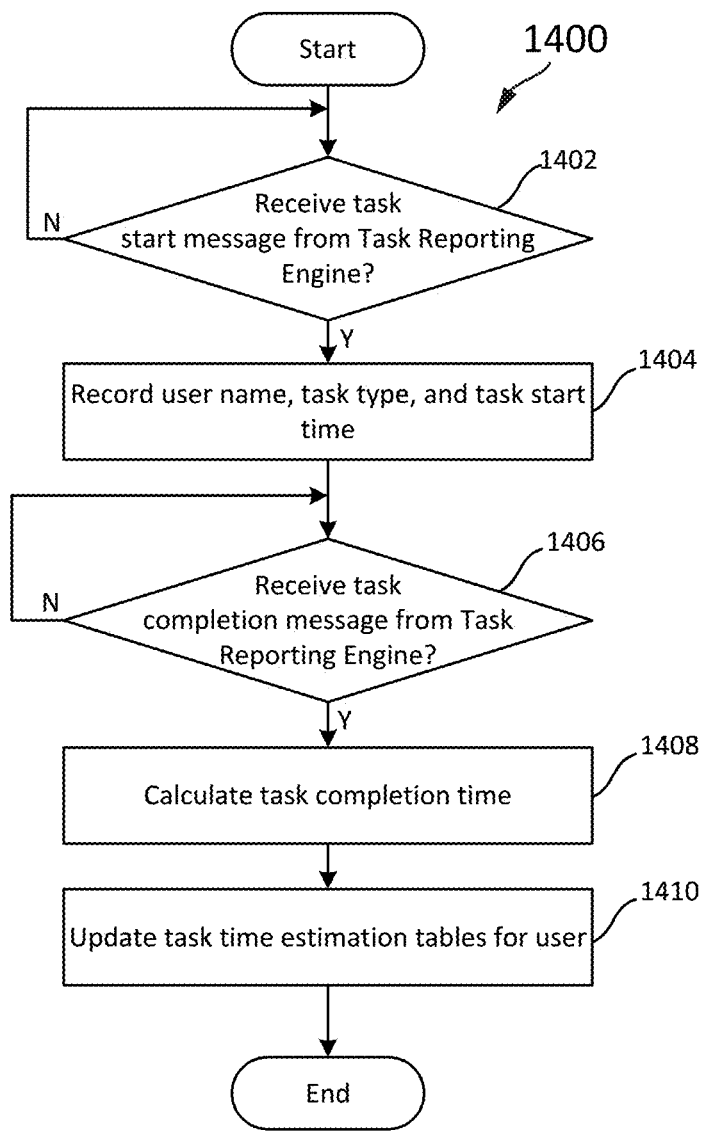
FIG. 14 is a flowchart showing an example routine that may be performed by the task time reporting service shown in FIG. 6.

As shown in FIG. 6, in some embodiments, the task time reporting engine 614 may be included within or operate in conjunction with an application executing on a client device 108, 202, such as the resource access application 522 described above in connection with FIG. 5C. As also shown in FIG. 6, in some implementations, the task time reporting service 604 may be included among the resource management services 502, e.g., as a part of the analytics service 536, within the cloud computing environment 512. FIGS. 13 and 14 are flowcharts showing example routines 1300 and 1400 that may be performed by the task time reporting engine 614 and the task time reporting service 604, respectively, to measure and record (A) amounts of time users of resource access applications 522 take to complete tasks corresponding to particular types of notification 106, 546 (see "duration" entries 1206 in the table 1202 shown in FIG. 12A), (B) weighing values (for "simple" activities) indicating how the determined amounts of time compare with "baseline time estimates" representing amounts of time average users are expected to take to complete those types of tasks (see "weight" entries 1208 in the table 1202), (C) average task "duration" values for particular types of "complex" tasks performed by particular users (see "average duration" entries 1210 in the table 1204 shown in FIG. 12B), and (D) average weighting values for particular types of "simple" tasks performed by particular users (see "average weight" entries 1212 in the table 1204 shown in FIG. 12B). The difference between "simple" activities and "complex" activities is explained below.

Figure 15:
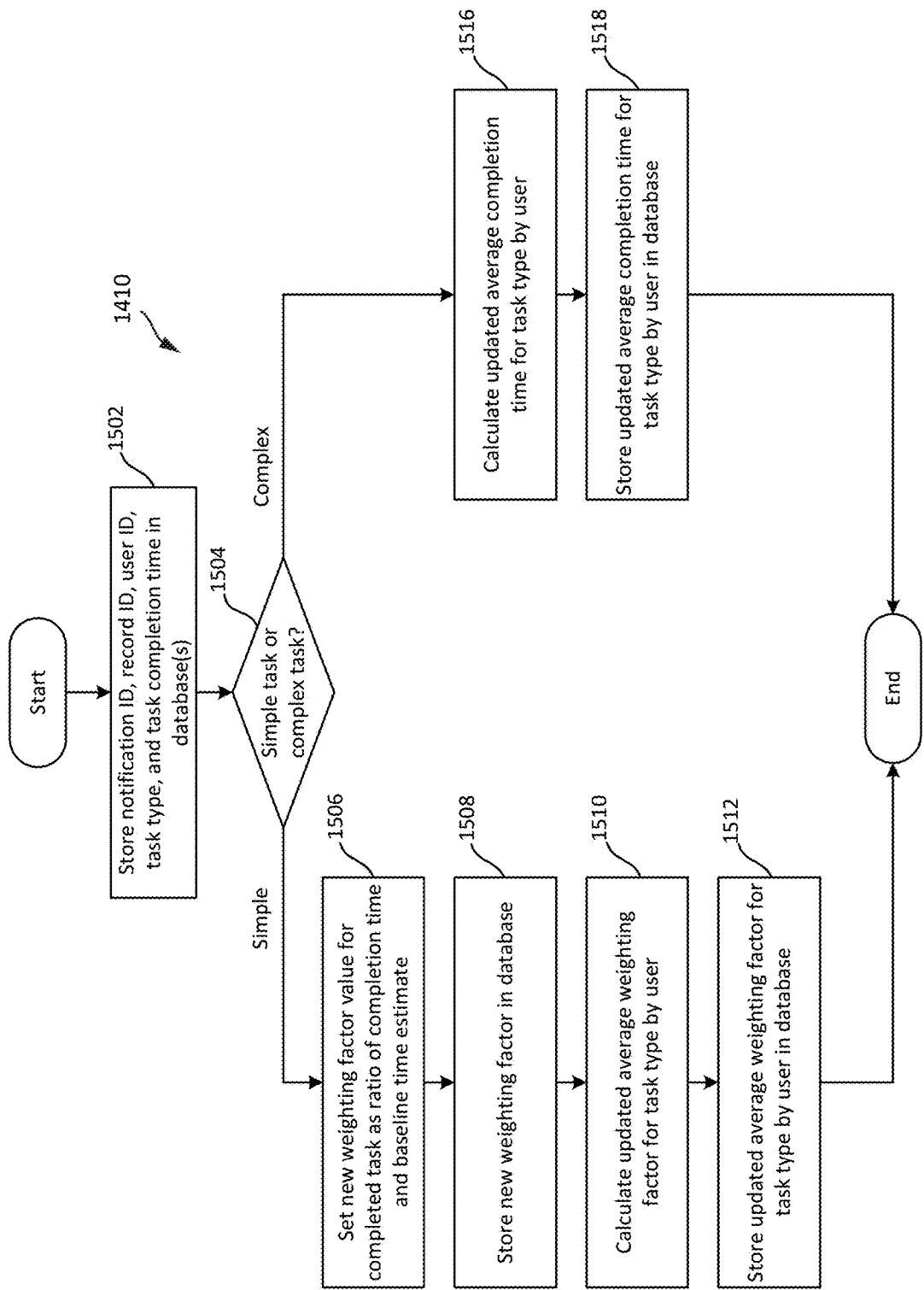
FIG. 15 is a flowchart illustrating an example implementation of the final step of the routine shown in FIG. 14.

FIG. 15 is a flowchart illustrating an example implementation of the step 1410 of the routine 1400 pursuant to which various entries in the tables 1202 and 1204 (shown in FIGS. 12A and 12B) may be updated based on the measured completion time for a particular type of task relating to a notification 106, 546.

Figure 17:
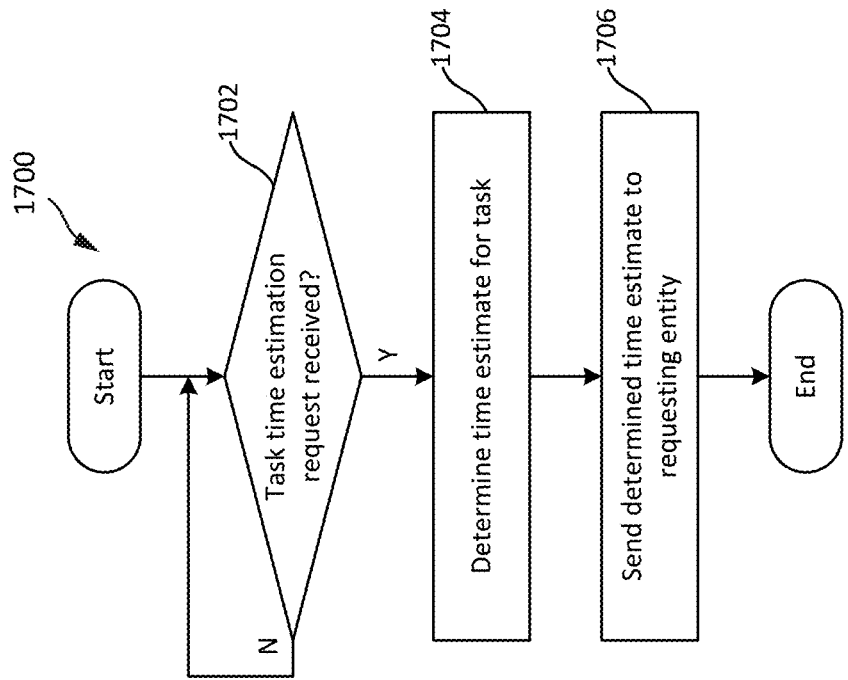
FIG. 17 is a flowchart showing an example routine that may be performed by the task time estimation service shown in FIG. 6.
Figure 16:
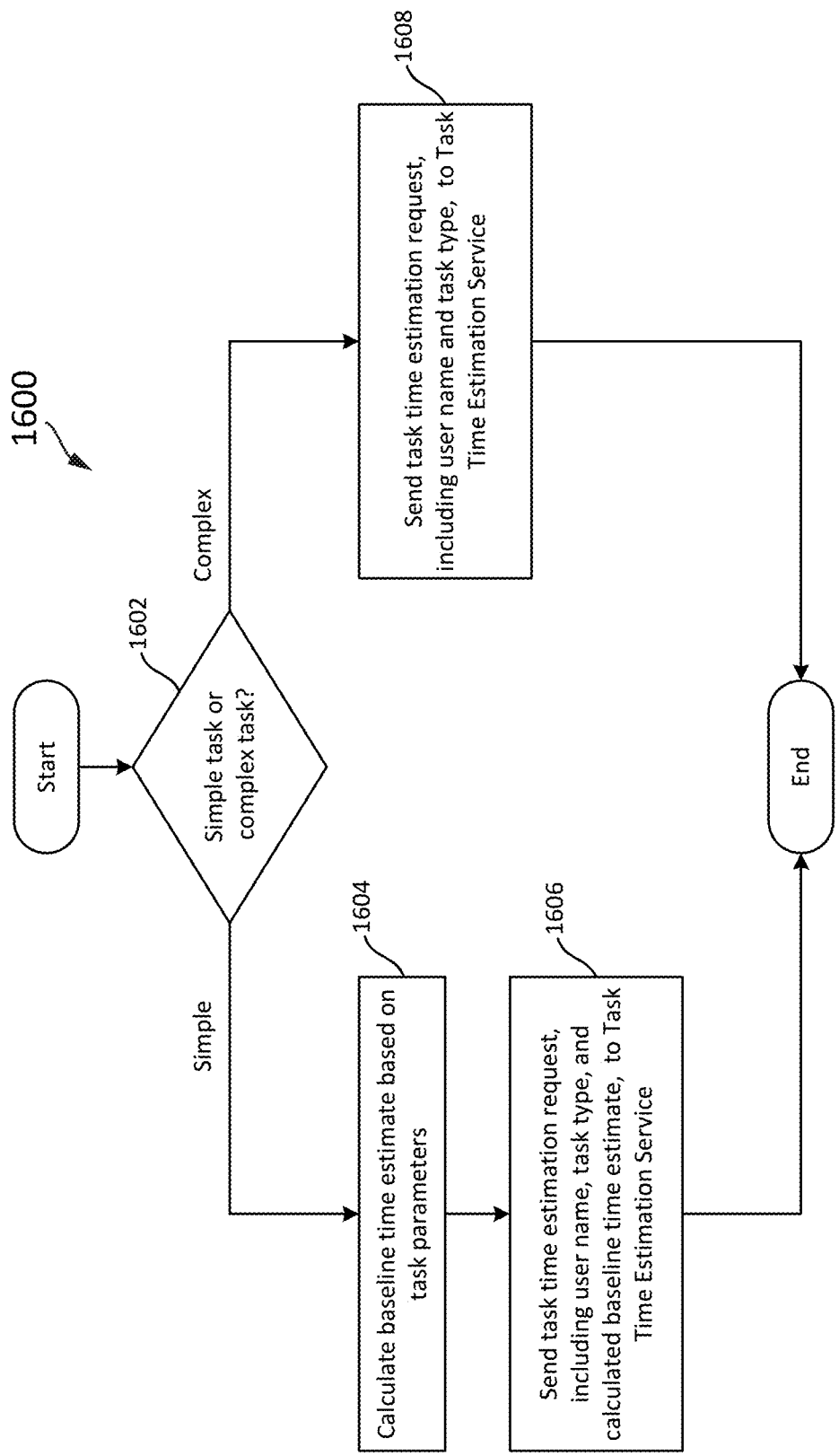
FIG. 16 is a flowchart showing an example routine that may be performed by the feature determination engine shown in FIG. 7.
Figure 18:
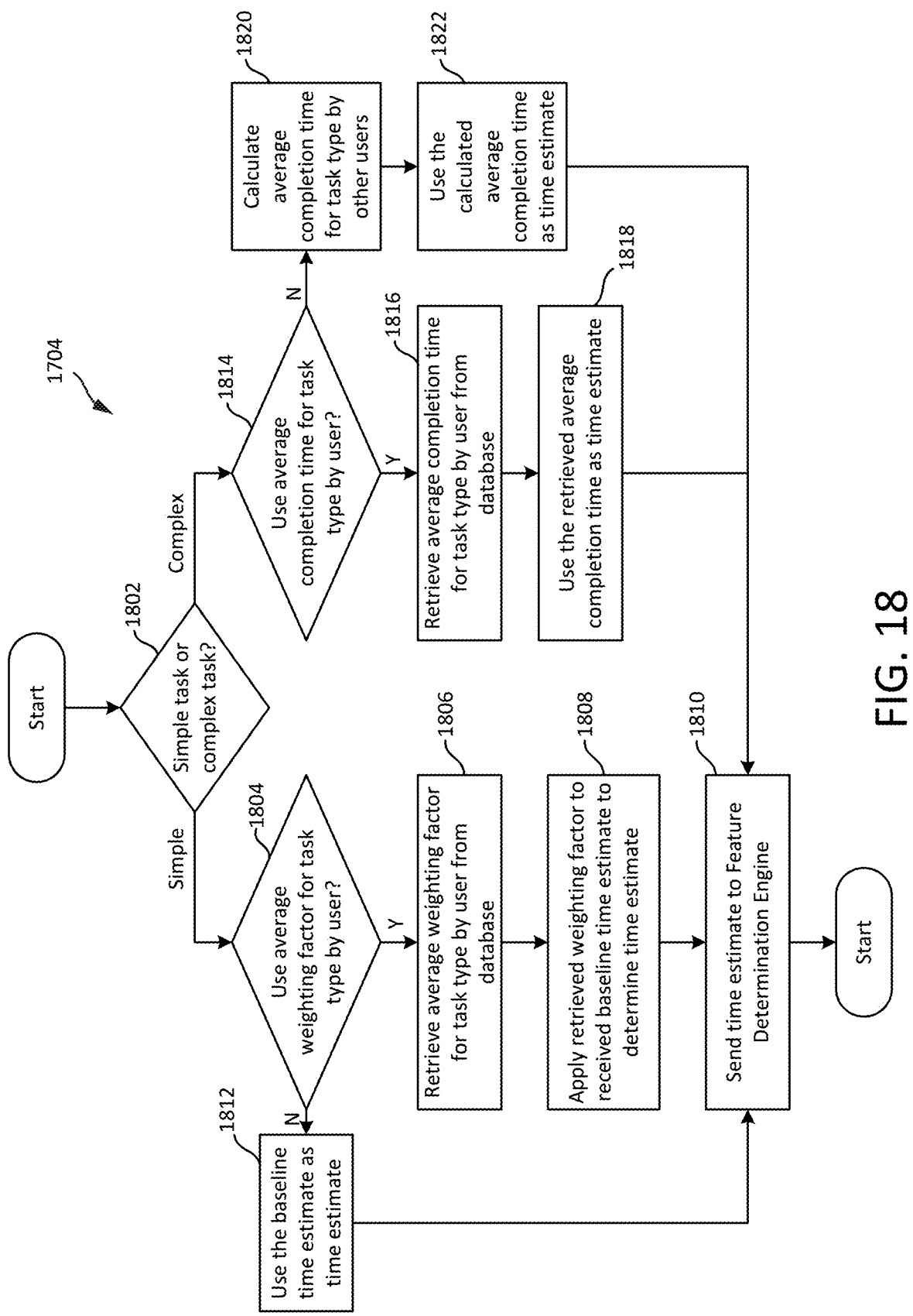
FIG. 18 is a flowchart illustrating example implementations of the second step of the routine shown in FIG. 17.

FIGS. 16 and 17 are flowcharts showing example routines 1600 and 1700 that may be performed by the feature determination engine 704 (shown in FIG. 7) and the task time estimation service 606, respectively, to determine a time cost estimate for a task corresponding to a particular notification 106, 546. FIG. 18 is a flowchart illustrating an example implementation of the step 1704 shown in FIG. 17.

The various steps of the routines 1300, 1400, 1600, and 1700 described herein may be implemented, for example, by one or more processors that execute instructions encoded on one or more computer-readable media. Such processor(s) and computer readable medium(s) may, for example, be configured like the computing system 300 described above in connection with FIG. 3, and/or may be included in or operate in conjunction with one or more client devices 108, 202 and/or the cloud computing environment 512 described above in connection with FIG. 5C.

Referring to FIG. 13, when the task time reporting engine 614 determines (at a decision step 1302) that a user has started a task associated with a notification 106, 546 in an activity feed 544, the routine 1300 may proceed to a step 1304. As explained in connection with FIGS. 5C and 5D above, the notifications 106, 546 may be implemented, for example, using "microapps" that can read and/or write data to a system of record using application programming interface (API) functions or the like, rather than by performing a full launch of the application for that system of record. In some embodiments, the start of a task associated with a notification 106, 546 (as determined at the decision step 1302) may correspond to an initial interaction a user 110, 524 has with the microapp that is used to implement the functionality of the notification 106, 546. Such initial interaction may, for example, involve a user clicking on or otherwise selecting a portion of the notification 106, 546 other than one of the user-interface elements 548, 550 so as to cause the resource access application 522 to display additional details concerning the event that triggered the notification 106, 546 and/or to provide access to additional functionality enabled by the microapp corresponding to the notification 106, 546 (e.g., in a separate pop-up window corresponding to the microapp). Additionally or alternatively, such initial interaction may correspond to a user selecting a user interface element within the notification 106, 546 that causes the native application to which the notification 106, 546 relates to be launched, thus allowing the user to respond to the event that prompted the notification via that native application rather than via the microapp.

At a step 1304 of the routine 1300, the task time reporting engine 614 may send an "task start message" to the task time reporting service 604. As indicated, such a task start message may identify the current user of the resource access application 522 in which the activity feed 544 is presented, the particular type of task to which the notification 106, 546 relates, and the time at which the user first interacted with the microapp corresponding to the notification 106, 546, as described above.

At a decision step 1306 of the routine 1300, the task time reporting engine 614 may determine whether the task corresponding to the notification 106, 546 has been completed. As noted above, as used herein, the phrase "complete a task" refers to a user taking some action that either clears the notification 106, 546 from the activity feed 544 or places the notification 106, 546 in a state that apprises the user that the notification 106, 546 no longer needs the user's attention. A user may complete a task corresponding to a notification 106, 546 for example, by selecting an action element 548 associated with a micro-app that indicates completion of a task, by launching the full application and taking an action responsive to the event that prompted the notification 106, 546, or by dismissing the notification, such as by clicking a close element 550.

At a decision step 1308 of the routine 1300, the task time reporting engine 614 may determine whether the activity corresponding to the notification 106, 546 is "simple" or "complex." In some embodiments, the determination at the decision step 1308 may be made, for example, by referencing a look up table that identifies the various possible task types as either simple or complex. In some implementations, those tasks for which the completion time is likely to depend primarily on a quantity of content (e.g., the number of words, number of video frames, etc.) or other parameter (e.g., scheduled meeting duration) of the content itself may be designated as "simple," whereas those tasks for which the completion time is likely to depend primarily on the nature and/or extent of input the user chooses to devote to the task at hand, and may thus not be accurately estimated based on a quantity (e.g., text count, frame count) or other parameter (e.g., scheduled meeting duration) of the content to which the task relates, may be designated as "complex."

As shown in FIG. 13, when the task time reporting engine 614 determines (at the decision step 1308) that the task is "simple," the routine 1300 may proceed to a step 1310, at which parameters of the task may be used to calculate a baseline time estimate for the task. As indicated above, such a baseline time estimate may represent the amount of time an average user is expected to take to complete a task having the indicated parameters. Illustrative examples of formulas that may be used to calculate baseline time estimates for simple activities are as follows. For task types involving the reading of text by the user, the formula $T_{text}=\text{Count}_{text}/\text{Speed}_{avg\_reading\_speed}$ may be used to calculate the baseline time estimate, with $T_{text}$ representing the calculated baseline time estimate to read the text, $\text{Count}_{text}$ representing the number of words or characters in the text, and $\text{Speed}_{avg\_reading\_speed}$ representing the number of words or characters per unit time (e.g., per minute) an average person is expected to read. For task types involving the viewing of video by the user, the formula $T_{video}=\text{Count}_{video}/\text{Speed}_{avg\_viewing\_speed}$ may be used to calculate the baseline time estimate, with $T_{video}$ representing the calculated baseline time estimate to view the video, $\text{Count}_{video}$ representing the number of frames or other measurement units of the video, and $\text{Speed}_{avg\_viewing\_speed}$ representing the number of frames or other video measurement units an average person is expected view per unit time (e.g., per minute). For task types involving scheduled meetings, the formula $T_{meeting}=\text{Time}_{end}-\text{Time}_{start}$ may be used to calculate the baseline time estimate, with $T_{meeting}$ representing the calculated baseline time estimate to participate in the meeting, $\text{Time}_{end}$ representing the scheduled ending time for the meeting, and $\text{Time}_{start}$ representing the starting time for the meeting. In some embodiments, a given notification 106, 546 may correspond to multiple simple task types (both the reading of text and the viewing of video), in which case respective baseline time estimates may be calculated and sent to the task time reporting service 604 for the different task types.

Further, although, in the example shown, baseline time estimates are calculated by the task time reporting engine 614, it should be appreciated that, in some embodiments, the task time reporting engine 614 may alternatively send one or more parameters for the task to the task time reporting service 604, so as to instead allow the task time reporting service 604 to use such parameters to calculate such baseline time estimate(s).

At a step 1312 of the routine 1300, the task time reporting engine 614 may send an "task completion message" to the task time reporting service 604. As indicated, such a task completion message may indicate the "task end time," i.e., the time at which the user completed the task in question, as well as the baseline time estimate(s) calculated at the step 1310.

As further shown in FIG. 13, when the task time reporting engine 614 determines (at the decision step 1308) that the task is "complex," the routine 1300 may proceed to a step 1314, at which the task time reporting engine 614 may send a task completion message to the task time reporting service 604. As indicated, such a task completion message for a complex task need only indicate the task end time.

With respect to the steps 1312 and 1314, it should be appreciated that when the initial interaction a user has with a microapp associated with a notification 106, 546 corresponds to the user clicking on or otherwise selecting a user interface element within the notification 106, 546 (e.g., an action element 548 or a "close" element 550) that immediately clears the notification 106, 546 from the activity feed 544 or places the notification 106, 546 in a state that apprises the user that the notification 106, 546 no longer needs the user's attention, such an interaction may be treated as both the start (corresponding to decision step 1302) and the completion (corresponding to decision step 1306) of the task corresponding to such a notification 106, 546. Accordingly, in some embodiments, only a single message may be sent to the task time reporting service 604 in such a circumstance. Such a message may indicate simply that it took the user no time to complete the task corresponding to the notification 106, 546.

Moreover, although not illustrated in FIG. 13, it should also be appreciated that, in some embodiments, the task time reporting engine 614 may also send additional messages to the task time reporting service 604 when it is determined that the user has temporarily stopped interacting with the microapp corresponding to the notification 106, 546 and/or when the user again resumes such interaction. For example, in some embodiments, a determination that a user has initiated interaction with a microapp associated with a different notification 106, 546 or has accessed other functionality of the resource access application 522 that is unrelated to the notification 106, 546 under consideration may cause the task time reporting engine 614 to apprise the task time reporting service 604 that the user has temporarily stopped interacting with microapp corresponding to that notification 106, 546. A determination that the user has again interacted with microapp under consideration may subsequently cause an "interaction resumed" message to be sent to the task time reporting service 604.

FIG. 14 shows an example routine 1400 that may be executed by the task time reporting service 604 upon receipt of task start message from the task time reporting engine 614 in accordance with the routine 1300 shown in FIG. 13. As shown, when the task time reporting service 604 determines (at a decision step 1402) that a task start message has been received from the task time reporting engine 614, the routine 1400 may proceed to a step 1404, at which the task time reporting service 604 may record (either in the database(s) 612 or another storage medium) the information included in the received task start message, e.g., the user's identity, the particular type of task involved, and the start time of the task.

Pursuant to a decision step 1406 of the routine 1400, the task time reporting service 604 may proceed to a step 1408 when the task time reporting service 604 determines that a task completion message has been received from the task time reporting engine 514. At the step 1408 of the routine 1400, the task time reporting service 604 may calculate the "task completion time," i.e., the total amount of time it took for the user to complete the task, e.g., by determining the difference between the task end time (included in the task completion message) and the previously-recorded task start time, and perhaps also taking into account pauses in the user's interaction with the microapp under consideration, e.g., based on additional "temporary stop" and/or "resume" messages received from the task time reporting engine 614, as described above.

At a step 1410 of the routine 1400, the task completion time calculated at the step 1408 may be used to update one or more of the entries in the tables 1202, 1204 (see FIGS. 12A and 12B). As described below, the tables 1202, 1204 may subsequently be used by the task time estimation service 606 to provide user-specific and/or and task-specific time estimates to the feature determination engine 704 of the collaboration scoring service 608. An example routine that may be used to implement the step 1410 of the routine 1400 in some embodiments is described below in connection with FIG. 15.

Although, in the example illustrated, the task time reporting service 604 is responsible for calculating the task completion time based on a "task start message" and a "task completion message" (and possibly also "temporary stop" and/or "resume messages") received from the task time reporting engine 614, in some embodiments, the task start time (and possibly temporary stop and/or resume times) may alternatively be recorded locally by the task time reporting engine 614 and the task completion time may also be calculated locally by the task time reporting engine 614. In such embodiments, the task time reporting engine 614 need not send a separate task start message (or temporary stop and/or resume messages) to the task time reporting service 604, and may instead simply send a task completion message (including the calculated task completion time) to the task time reporting service 604 upon the task time reporting engine 614 determining that the task has been completed.

An example routine that may be used to implement the step 1410 of the routine 1400 in some embodiments will now be described with reference to FIG. 15. As shown, at a step 1502, the task time reporting service 604 may record the task completion time (determined at the step 1408 of the routine 1400) as one of the "duration" entries 1206 in the table 1202 (shown in FIG. 12A). As indicated, the task time reporting service 604 may further record in the table 1202, for each such task completion time, other information about the task as well as the notification 106, 546 to which the task relates. In particular, the task time reporting service 604 may record a unique identifier of the notification 106, 546 within the system 102 (see "notification ID" entries 1214), a unique identifier of the task within the system of record to which the task relates (see "task ID" entries 1216), a unique identifier of the user 110, 524 within the system 102 (see "user ID" entries 1218), and an indicator of the type of task involved (see "task type" entries 1220). The notification IDs, task IDs, user IDs, and task type indicators may be obtained in any of a number of ways and may come from any of a number of sources. In some implementations, for example, some or all of such information may be included in task start messages and/or the task completion messages that are received from the task time reporting engine 614. In other implementations, some or all of such information may be retrieved from or reference may be made to other records maintained by the database(s) 612 that indicate associations between such data.

At a decision step 1504 (see FIG. 15), the task time reporting service 604 may determine whether the particular task type with which the newly-recorded task completion time corresponds is categorized as a "simple" task or a "complex" task. As shown in FIG. 12A, in some implementations, the "task type" entries 1220 recorded in the table 1202 may indicate whether the task is "simple" or "complex," and the determination at the decision step 1504 may be based on that information.

As shown in FIG. 15, when the task time reporting service 604 determines (at the decision step 1504) that the task is "simple," the routine 1410 may proceed to a step 1506, at which a new weighting factor for the newly-recorded task may be determined. As indicated for the step 1506, the new weighting factor may be set to be equal to a ratio of the actual task completion time (e.g., as calculated at the step 1408 of the routine 1400—shown in FIG. 14) to the baseline time estimate (e.g., as calculated at the step 1310 of the routine 1300—shown in FIG. 13). At a step 1508, the new weighting factor so calculated may then be stored as a "weight" entry 1208 in the table 1202 (shown in FIG. 12A) in association with the other information relating to the task being evaluated.

At a step 1510, an updated value of an average weighting factor associated with the user and the task type in question may be calculated, e.g., by calculating the average value of all the recorded weighting factors, including the newly-recorded weighting factor, that are associated with that user and that task type.

At a step 1512, the updated average value for the recorded weighting factors may be recorded in association with the user and the task type. With reference to the table 1204, for example, an "average weight" entry 1212 may be updated to reflect the updated average weight associated with that user performing that particular type of task.

As explained below in connection with step 1808 of the routine 1704 (shown in FIG. 18), the task time estimation service 606 may subsequently apply the updated average weight recorded in the table 1204 against a baseline time estimate for the corresponding task type to determine a user-specific time estimate for completion of another task of the same type.

As shown in FIG. 15, when the task time reporting service 604 determines (at the decision step 1504) that the task is "complex," the routine 1410 may proceed to a step 1516 at which an updated value of an average completion time associated with the user and the task type in question may be calculated, e.g., by calculating the average value of all the recorded completion time durations, including the newly-recorded completion time, that are associated with that user and that task type.

At a step 1518, the updated average value for the recorded completion time durations may be recorded in association with the user and the task type. With reference to table 1204, for example, the "average duration" entry 1210 may be updated to reflect the updated average completion time duration associated with that user performing that particularly type of task.

As explained below in connection with step 1818 of the routine 1704 (shown in FIG. 18), the task time estimation service 606 may subsequently use the updated average completion time duration recorded in the table 1204 as a time estimate for that user to complete another task of the same type.

FIG. 16 shows an example routine 1600 that may be executed by the feature determination engine 704 (shown in FIG. 7) to request a task time estimate from the task time estimation service 606. As shown, at a decision step 1602, the feature determination engine 704 may determine whether the notification 106, 546 being evaluated relates to a "simple" task or a "complex" task. The decision step 1602 is analogous to and may be implemented in the same or a similar manner as the decision step 1306 of the routine 1300 (shown in FIG. 13), as described above.

As shown in FIG. 16, when the feature determination engine 704 determines (at the decision step 1602) that the task is "simple," the routine 1600 may proceed to a step 1604, at which parameters of the task may be used to calculate a baseline time estimate for the task. The step 1604 is analogous to and may be implemented in the same or a similar manner as the step 1310 of the routine 1300 (shown in FIG. 13), as described above.

At a step 1606, the feature determination engine 704 may send a task time estimation request to the task time estimation service 606. As indicated, the task time estimation request that is so sent may include the identity of the user to whom the notification 106 in question pertains (if the task has been assigned to a particular user), the type of task involved, and the baseline time estimate that was calculated at the step 1604. In this regard, it should be appreciated that, as was the case with the task time reporting engine 614, in some embodiments, the feature determination engine 704 may alternatively send one or more parameters for the task to the task time estimation service 606, so as to instead allow the task time estimation service 606 to use such parameters to calculate such baseline time estimate(s).

As further shown in FIG. 16, when the feature determination engine 704 determines (at the decision step 1602) that the task is "complex," the routine 1600 may proceed to a step 1608, at which the feature determination engine 704 may send a task time estimation request to the task time estimation service 606. As indicated, for complex activities, the task time estimation request that is so sent may simply identify the user to whom the task in question pertains (if the task has been assigned to a particular user) as well as the type of task involved.

FIG. 17 shows an example routine 1700 that may be performed by the task time estimation service 606 to process task time estimation requests that are received from the feature determination engine 704. As shown, the task time estimation service 606 may (at a decision step 1702) determine whether a task time estimation request has been received from the feature determination engine 704 (e.g., per the step 1606 or 1608 of the routine 1600—shown in FIG. 16). When the task time estimation service determines that a task time estimation request has been received from the feature determination engine 704, the routine 1700 may proceed to a step 1704, at which an estimated time for completing the task may be determined. FIG. 18, described below, shows an example routine that may be performed to implement the step 1704 in some embodiments. At a step 1706, the task time estimation service 606 may then send the determined task time estimate to the feature determination engine 704.

Referring now to FIG. 18, the example routine 1704 will be described. As illustrated, the task time estimation service 606 may (at a decision step 1802) determine whether the notification being evaluated relates a "simple" task or a "complex" task. The decision step 1802 is analogous to and may be implemented in the same or a similar manner as the decision step 1602 of the routine 1600 (shown in FIG. 16), as described above.

As shown in FIG. 18, when the task time estimation service 606 determines (at the decision step 1802) that the task is "simple," the routine 1704 may proceed to a decision step 1804, at which the task time estimation service 606 may determine whether to use an average weighting factor corresponding to a user and task type to determine the requested task time estimate. Examples of circumstances in which the task time estimation service 606 may determine not to use such an average weighting factor include (A) when the identity of the user who is to perform the task is not known or cannot be determined at the time the task time request is received, and (B) when an "average weight" entry 1212 has not yet been recorded in the table 1204 for the user and task type in question.

When the task time estimation service 606 determines (at the decision step 1804) that it is to use an average weighting factor to determine the requested task time estimate, the routine 1704 may proceed to a step 1806, at which the average weighting factor corresponding to the user and task type may be retrieved from the table 1204.

At a step 1808, the retrieved average weighting factor may be applied against the baseline time estimate that was included in the task time estimation request received from the feature determination engine 704. In some implementations, for example, the task time estimation service 606 may multiply the baseline time estimate by the weighting factor to yield a user-specific time estimate for completing the task in question.

At a step 1810, the task time estimation service 606 may send the determined time estimate for the identified task to the feature determination engine 704.

When the task time estimation service 606 determines (at the decision step 1804) not to use an average weighting factor to determine the requested task time estimate, the routine 1704 may instead proceed to a step 1812, at which the task time estimation service 606 may use the baseline time estimate that was included in the task time estimation request as the time estimate that is returned to the feature determination engine 704 at the step 1810. In other words, a weighting factor of "1" may be applied against the received baseline time estimate in such a circumstance.

When the task time estimation service 606 determines (at the decision step 1802) that the task is "complex," the routine 1704 may proceed to a decision step 1814, at which the task time estimation service 606 may determine whether to use an average completion time corresponding to a user and task type to determine the requested task time estimate. Examples of circumstances in which the task time estimation service 606 may determine not to use such an average completion time include (A) when the identity of the user who is to perform the task is not known or cannot be determined at the time the task time request is received, and (B) when an "average duration" entry 1210 has not yet been recorded in the table 1204 for the user and task type in question.

When the task time estimation service 606 determines (at the decision step 1814) that it is to use an average completion time to determine the requested task time estimate, the routine 1704 may proceed to a step 1816, at which the average completion time corresponding to the user and task type may be retrieved from the table 1204.

At a step 1818, the task time estimation service 606 may use the retrieved average completion time as a user-specific time estimate that is to be sent to the feature determination engine 704 (at the step 1810).

When the task time estimation service 606 determines (at the decision step 1814) not to use an average completion time to determine the requested task time estimate, the routine 1704 may instead proceed to a step 1820, at which records associated with other users may be referenced to calculate an estimated completion time. In some implementations, for example, an average of the "duration entries" 1206 in the table 1202 for other users for the task type in question may be calculated. In other implementation, an average of the "average duration" entries 1210 for other users for the type of task at issue may be calculated.

At the step 1822, the task time estimation service 606 may use the average completion time calculated at the step 1820 as the time estimate that is sent to the feature determination engine 704 (at the step 1810).

Figures 19A, 19B:
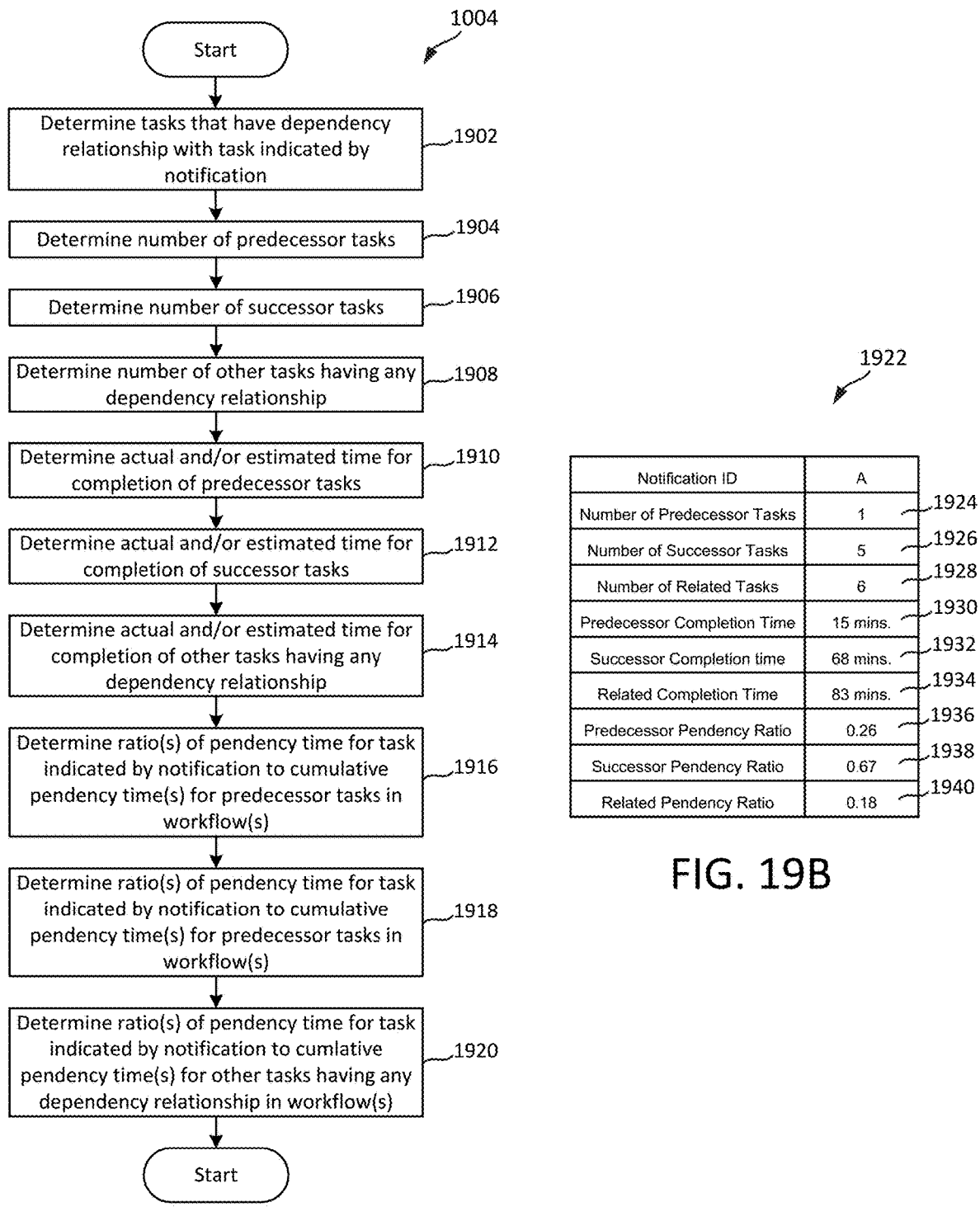
FIG. 19A is a flowchart illustrating example steps that may be performed by the feature determination engine shown in FIG. 7 to implement the second step of the routine shown in in FIG. 10.
FIG. 19B shows a table that includes examples of parameters that may be determined by the feature determination engine shown in FIG. 7 pursuant to the routine shown in the FIG. 19A.

FIG. 19A is a flow chart illustrating example steps 1902, 1904, 1906, 1908, 1910, 1912, 1914, 1916, 1918, and 1920 that may be performed by the feature determination engine 704 to implement the step/routine 1004 shown in FIG. 10, i.e., to determine the parameters 114 relating to one or more tasks that have a dependency relationship with the task indicated by the notification 106, 546 for which a collaboration priority score 104 has been requested. FIG. 19B shows a table 1922 that includes examples of parameters 114 that may be determined by the feature determination engine 704 pursuant to the steps 1904, 1906, 1908, 1910, 1912, 1914, 1916, 1918, and 1920. In the illustrated example, the parameters 114 reflected in the table 1922 are determined for tasks that have a dependency relationship with the task indicated by notification "A."

As shown in FIG. 19A, at the step 1902 of the routine 1004, the feature determination engine 704 may determine other tasks that have a dependency relationship with the task that is indicated by the notification 106, 546 for which a collaboration priority score 104 has been requested. As discussed above in Section A, in some implementations, dependency relationships amongst various tasks may be represented by a digraph, such as the digraph 116 shown in FIG. 1B. Data structures or other information identifying the various tasks in respective workflows and the dependency relationships amongst such tasks may, for example, be obtained from providers of applications to which the tasks relate (e.g., SaaS companies, such as Workday, SAP, etc., enterprise software providers, etc.) and/or may be generated independently based on acquired knowledge about task workflows. In some implementations, for example, systems of record may assign unique task identifiers to respective tasks that are to be performed by users, and such unique task identifiers may be recorded in the database(s) 612 in association with unique identifiers of the notifications 106, 546 to which such tasks relate. In the tables 1202 (shown in FIG. 12A) and 2102 (described below in connection with FIG. 21), for example, "task ID" entries 1216, 2104 may uniquely identify tasks within the systems of record 526 to which such tasks relate.

In some implementations, systems of record 526 may make available information (in response to queries or otherwise) that identifies, for any given task, other tasks that "depend on" the given task as well as other tasks that are "contained in" the given task. In such implementations, for purposes of a digraph representation, any tasks that a given task "depends on" may be considered predecessor tasks and any tasks that the given tasks are "included in" may be considered successor tasks.

With reference to the digraph 116 shown in FIG. 1B, for example, a system of record may have indicated that TaskC "depends on" Task A, and may have further indicated that TaskC is "included in" each of TaskF, TaskG, TaskH, TaskI, and TaskJ. Accordingly, based on such information, the feature determination engine 704 may determine that TaskA, TaskF, TaskG, TaskH, TaskI, and TaskJ have dependency relationships with TaskC, with TaskA being a predecessor task of TaskC, and with TaskF, TaskG, TaskH, TaskI, and TaskJ being successor tasks of TaskC.

Referring again to FIG. 19A, at a step 1904 of the routine 1004, the feature determination engine 704 may evaluate the tasks determined at the step 1902 to determine how many of those tasks are predecessor tasks for the task that is indicated by the notification 106, 546 for which a collaboration priority score 104 has been requested. If the task indicated by the notification 106, 546 being evaluated is TaskC of the digraph 116, for example, the feature determination engine 704 may determine that the number of predecessors of TaskC is "1," and may use that value as a parameter 1924 that is to be included among the parameters 114 that are provided to the feature analysis engine 706 for processing.

At a step 1906 of the routine 1004, the feature determination engine 704 may evaluate the tasks determined at the step 1902 to determine how many of those tasks are successor tasks for the task that is indicated by the notification 106, 546 for which a collaboration priority score 104 has been requested. If the task indicated by the notification 106, 546 being evaluated is TaskC of the digraph 116, for example, the feature determination engine 704 may determine that the number of successors of TaskC is "5," and may use that value as a parameter 1926 that is to be included among the parameters 114 that are provided to the feature analysis engine 706 for processing.

At a step 1908 of the routine 1004, the feature determination engine 704 may evaluate the tasks determined at the step 1902 to determine how many of those tasks have any dependency relationship with the task that is indicated by the notification 106, 546 for which a collaboration priority score 104 has been requested. In some implementations, the quantity of such tasks may be determined simply by summing the determined number of predecessor tasks (determined at the step 1904) and the determined number of successor tasks (determined at the step 1906). If the task indicated by the notification 106, 546 being evaluated is TaskC of the digraph 116, for example, the feature determination engine 704 may determine that the number of tasks that have any dependency relationship with TaskC is "6," and may use that value as a parameter 1928 that is to be included among the parameters 114 that are provided to the feature analysis engine 706 for processing.

Although not illustrated in FIG. 19A or 19B, another value that may be included in the parameters 114 provided to the feature analysis engine 706 is a metric indicating an availability of other team members to which predecessor and/or successor tasks have been assigned. For instance, in addition to or in lieu of the parameters 1924, 1926 and/or 1928 relating to the number of predecessor, successor, and "related" tasks, respectively, parameters reflecting the availability of the individuals to whom such tasks have been assigned may further be determined and provided to the feature analysis engine 706 as component(s) of the parameters 114. For example, in addition to the parameter 1924 (shown in FIG. 19B) indicating that there is "1" predecessor task, an additional parameter may be provided to indicate that "0" or "1" individuals to whom predecessor tasks have been assigned are currently available. Similarly, in addition to the parameter 1926 (shown in FIG. 19B) indicating that there are "5" successor tasks, an additional parameter may be provided to indicate that "0," "1," "2," "3," "4," or "5" individuals to whom successor tasks have been assigned are currently available. Likewise, in addition to the parameter 1928 (shown in FIG. 19B) indicating that there are "6" related tasks, an additional parameter may be provided to indicate that "0," "1," "2," "3," "4," "5," or "6" individuals to whom related tasks have been assigned are currently available. The availability of individuals to whom tasks are assigned may be determined, for example, by referring to electronic calendars or other availability or presence indicators that are accessible to the feature determination engine 704.

Figure 20:
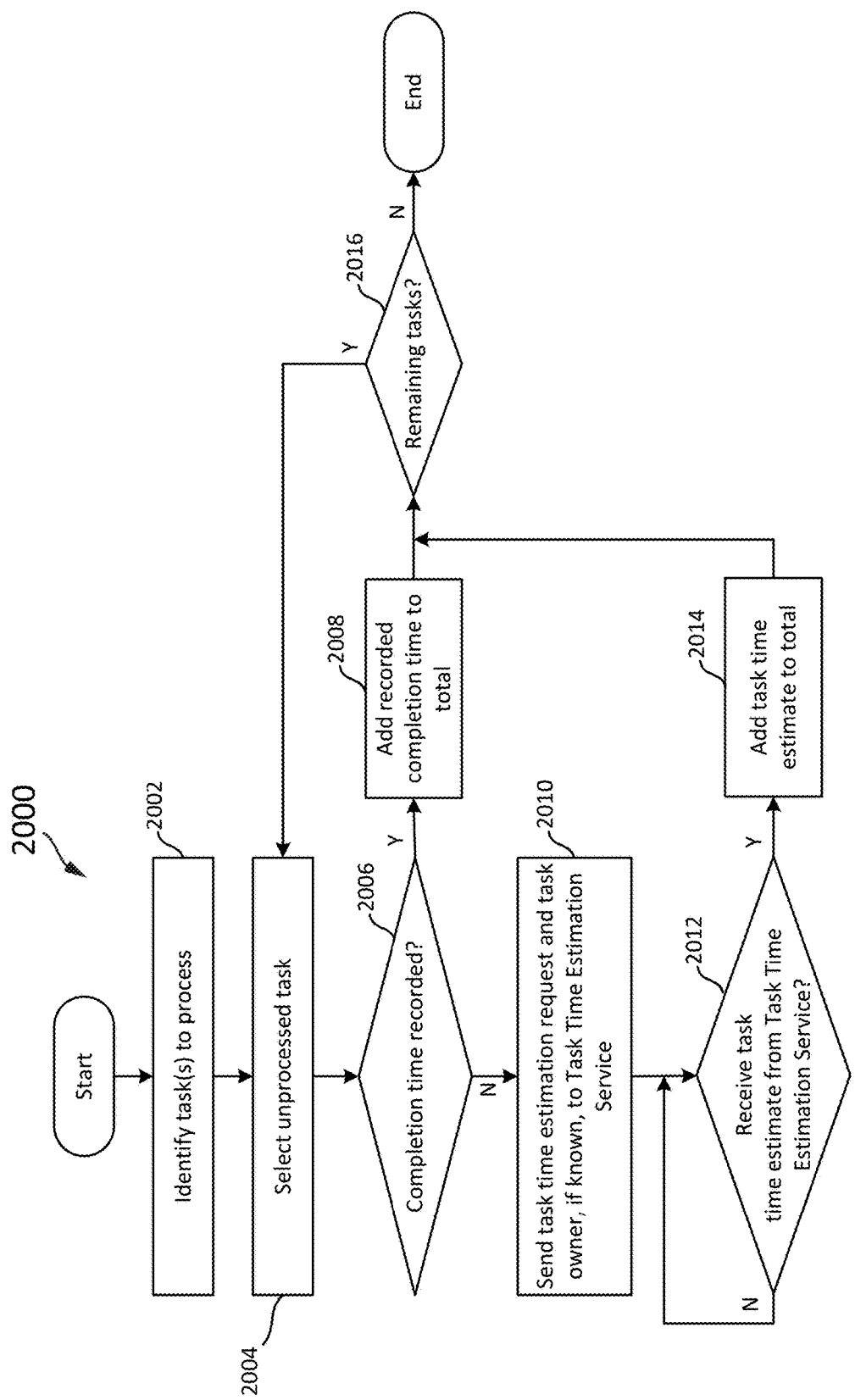
FIG. 20 is a flowchart showing an example routine that may be performed by the feature determination engine shown in FIG. 7 to cycle through a set of identified tasks, determine actual and/or estimated times for such tasks, and sum together such determined amounts of time.

At a step 1910 of the routine 1004, the feature determination engine 704 may evaluate the predecessor tasks determined at the step 1904 to determine, for each such predecessor task, either the time it took a user to complete the task, if the task has already been completed, or an estimated amount of time it will take to complete the task, if the task has not yet been completed. The feature determination engine 704 may then sum together all of the determined actual and/or estimated completion times for the predecessor tasks, and may use that summed time value as a parameter 1930 that is to be included among the parameters 114 that are provided to the feature analysis engine 706 for processing. FIG. 20, which is described in more detail below, shows an example routine 2000 that may be performed by the feature determination engine 704 to cycle through the predecessor tasks, determine actual and/or estimated times for such tasks, and sum together such determined amounts of time. As explained below in connection with FIG. 20, for any tasks that have not yet been completed, the feature determination engine 704 may send requests for time cost estimates, along with the identities (if known) of the user(s) to whom such tasks have been assigned, to the task time estimation service 606.

At a step 1912 of the routine 1004, the feature determination engine 704 may evaluate the successor tasks determined at the step 1906 to determine, for each such successor task, either the time it took a user to complete the task, if the task has already been completed, or an estimated amount of time it will take to complete the task, if the task has not yet been completed. The feature determination engine 704 may then sum together all of the determined actual and/or estimated completion times for the successor tasks, and may use that summed time value as a parameter 1932 that is to be included among the parameters 114 that are provided to the feature analysis engine 706 for processing. FIG. 20, which is described in more detail below, shows an example routine 2000 that may be performed by the feature determination engine 704 to cycle through the successor tasks, determine actual and/or estimated times for such tasks, and sum together such determined amounts of time. As explained below in connection with FIG. 20, for any tasks that have not yet been completed, the feature determination engine 704 may send requests for time cost estimates, along with the identities (if known) of the user(s) to whom such tasks have been assigned, to the task time estimation service 606.

At a step 1914 of the routine 1004, the feature determination engine 704 may evaluate the tasks determined at the step 1902 to determine, for each such task, either the time it took a user to complete the task, if the task has already been completed, or an estimated amount of time it will take to complete the task, if the task has not yet been completed. The feature determination engine 704 may then sum together all of the determine actual and/or estimated completion times for such tasks, and may use that summed time value as a parameter 1934 that is to be included among the parameters 114 that are provided to the feature analysis engine 706 for processing. In some implementations, the parameter 1934 may be determined simply by summing the time quantity determined at the step 1910 and the time quantity determined at the step 1912.

As noted above, the routine 2000 shown in FIG. 20 may be performed by the feature determination engine 704 to cycle through predecessor and/or successor tasks to determine actual and/or estimated times for such tasks, and sum together such determined amounts of time.

As shown in FIG. 20, the routine 2000 may begin at steps 2002 and 2004, at which the feature determination engine 704 may identify a set of one or more tasks that are to be processed (per the step 2002) and then select one such task for processing (per the step 2004).

At a decision step 2006 of the routine 2000, the feature determination engine 704 may determine whether a completion time for the selected task has been recorded in the database(s) 612. For example, as noted above, in some implementations, the task time reporting service 604 may record completion times for respective tasks as "duration" entries 1206 in the table 1202 shown in FIG. 12A.

When, at the decision step 2006, the feature determination engine 704 determines that a completion time has been recorded in the database(s) 612, the routine 2000 may proceed to a step 2008, at which that the feature determination engine 704 may add that recorded time to a total amount of time that is to be provided to the feature determination engine 706 as one of the parameters 114. Following the step 2008, the routine 2000 may proceed to a decision step 2016, at which the feature determination engine 704 may determine whether there are any remaining tasks that were identified at the step 2002 that have not yet been processed.

When, at the decision step 2016, the feature determination engine 704 determines that there is at least one remaining task to be processed, the routine 2000 may return to the step 2004, at which another one of the tasks identified at the step 2002 may be selected for processing by the subsequent steps.

When, at the decision step 2006, the feature determination engine 704 determines that a completion time has not been recorded in the database(s) 612, the routine 2000 may proceed to a step 2010, at which that the feature determination engine 704 may send a task time estimation request to the task time estimation service 606. As indicated, if the task has been assigned to a particular user ("task owner"), the identity of the task owner may also be provided to the task time estimation service 606, so as to enable the task time estimation service 606 to determine a user-specific task time estimate, as discussed above.

At a decision step 2012 of the routine 2000, the feature determination engine 704 may wait until a task time estimate has been received from the task time estimation service 606. Once a task time estimate has been received from the task time estimation service 606, the routine 2000 may proceed to a step 2014, at which that the feature determination engine 704 may add that task time estimate to the total amount of time that is to be provided to the feature determination engine 706 as one of the parameters 114. Following the step 2014, the routine 2000 may proceed to the decision step 2016, at which, as noted above, the feature determination engine 704 may determine whether there are any remaining tasks that were identified at the step 2002 that have not yet been processed. The routine 2000 may thus cycle through all the tasks determined at the step 2002 and, for each such task, adds either an actual task completion time or an estimated task completion time to a total time value that may be provided to the feature analysis engine 706 as one of the parameters 114.

The remaining steps 1916, 1918, and 1920 in the routine 1004 shown in FIG. 19 may, in at least some implementations, rely upon data that is written to the table 2102 (shown in FIG. 21) by the notification pendency monitoring service 602. The functionality of the notification pendency monitoring service 602 will thus be described prior to describing the steps 1916, 1918, and 1920.

Figure 21:
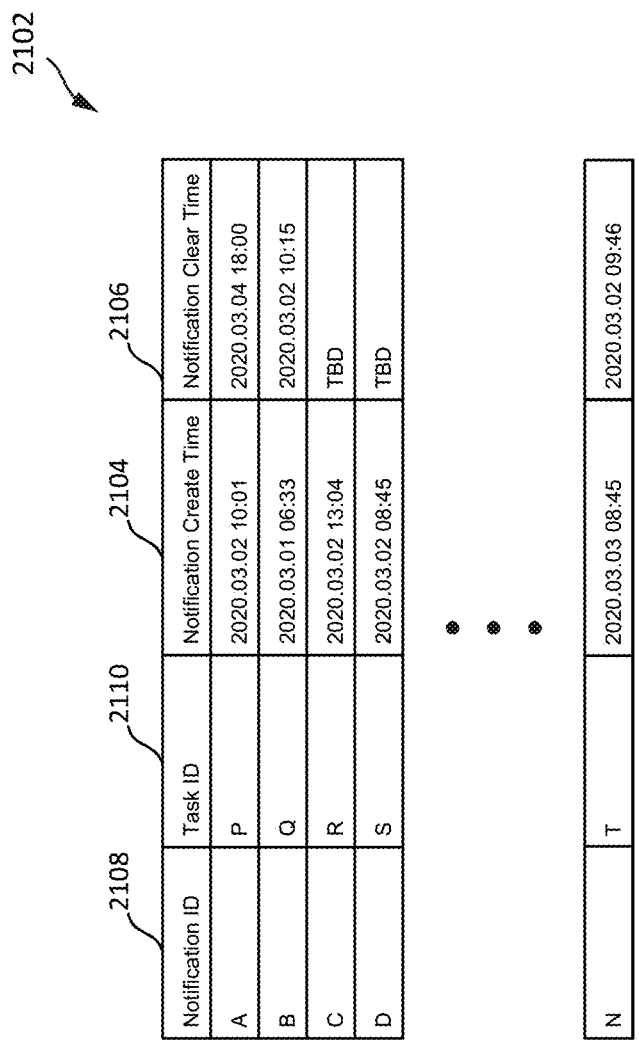
FIG. 21 shows a table that includes examples of data that the notification pendency monitoring service shown in FIG. 6 may record concerning times at which notifications are created and times at which notifications are cleared from activity feeds.

The notification pendency monitoring service 602 (shown in FIG. 6) may take on any of numerous forms and may be implemented in a number of ways. In some implementations, the notification pendency monitoring service 602 may be any component that is capable of recording information, e.g., in the database(s) 612, indicating times at which respective notifications are first created for inclusion in an activity feed 544 as well as times at which such notifications are cleared from such activity feeds 544. In some implementations, the notification pendency monitoring service 602 may be embodied by an existing component in the analytics service 536, the notification service 538, or elsewhere in the resource management services 502 shown in FIG. 5C. In other implementations, the notification pendency monitoring service 602 may instead be a separate functional component that is dedicated for use with the collaboration scoring service 608. No matter how or where it is embodied, the notification pendency monitoring service 6-2 may record information in the database(s) 612 that allows the feature determination engine 704 to determine the pendency times of respective notifications 106, 546 within the system. FIG. 21 shows an example table 2102 that includes information the feature determination engine 704 may use for that purpose.

As shown in FIG. 21, the table 2101 may include "notification create time" entries 2104 representing times at which respective notifications 106, 546 were created in the system, and may also include, for any notifications 106, 546 that have been cleared from the system, "notification clear time" entries 2106 representing times at which such notifications 106, 546 were cleared. For any notification 106, 546 that has been cleared, the difference between the "notification clear time" entry 2106 and the "notification create time" entry 2104 may represent the total amount of time that notification remained pending in the system. For any notifications 106, 546 that have not yet been cleared, on the other hand, the difference between the current time and the "notification create time" entry 2104 may represent the total amount of time that notification has thus far been pending in the system. As indicated, the "notification create time" entries 2104 and the "notification clear time" entries 2106 may be stored in association with "notification ID" entries 2108 which may uniquely identify notifications 106, 546 within the system 102, and "task ID" entries 2110 which may uniquely identify tasks within the systems of record 526 to which such tasks relate. In some implementations, the "notification create time" entries 2104 and the "notification clear time" entries 2106 may be stored together with other data in the table 900 shown in FIG. 9 and/or the table 1202 shown in FIG. 12A, rather than in a separate table.

Referring again to FIG. 19A, at a step 1916 of the routine 1004, the feature determination engine 704 may determine a metric that compares an amount of time the notification 106, 546 for which a collaboration priority score 104 has been requested has been pending to the cumulative pendency time(s) for notifications corresponding to predecessor tasks in the same workflow(s), where each such pendency time corresponds either to amount of time that a notification has been pending in an activity feed 544 or to an amount of time that a notification remained pending before it was cleared from an activity feed 544.

In some implementations, the task indicated by the notification 106, 546 being evaluated may be included in each of several workflows. For example, with reference to the digraph 116 shown in FIG. 1B, TaskG is included in two different workflows, including (1) TaskA»TaskC»TaskG»TaskJ, and (2) TaskA»TaskD»TaskG»TaskJ. In such a case, for each such workflow, a separate ratio may be calculated between the pendency time for the notification being evaluated and the cumulative pendency time for the predecessor tasks in that same workflow. In some implementations, such separate ratios may then be averaged together to determine a "predecessor pendency ratio" parameter 1936 (see table 1922 in FIG. 19B) that may be provided to the feature analysis engine 706 as one of the parameters 114. An example routine 2200 that may be employed to cycle through various tasks of various workflows to determine such a pendency time ratio with respect to predecessor tasks is described below in connection with FIG. 22. As discussed below in connection with step 2208 of the routine 2200, in some implementations, the feature determination engine 704 may consider only those tasks in a workflow that are associated with generated notifications 106, 546 when determining the "predecessor pendency ratio" parameter 1936. This restriction may be accomplished, for example, by having the feature determination engine 704 identify for a given workflow, at the step 2208 of the routine 2200, only those predecessor tasks for which a "notification create time" entry 2104 has been made in the table 2102 shown in FIG. 21.

Referring yet again to FIG. 19A, at a step 1918 of the routine 1004, the feature determination engine 704 may determine a metric that compares an amount of time the notification 106, 546 for which a collaboration priority score 104 has been requested has been pending to the cumulative pendency time(s) for notifications corresponding to successor tasks in the same workflow(s), where each such pendency time corresponds either to amount of time that a notification has been pending in an activity feed 544 or to an amount of time that a notification remained pending before it was cleared from an activity feed 544.

As noted above, in some implementations, the task indicated by the notification 106, 546 being evaluated may be included in each of several workflows. For example, with reference to the digraph 116 shown in FIG. 1B, TaskC is included in each of three different workflows, including (1) TaskA»TaskC»TaskF»TaskI, (2) TaskA»TaskC»TaskG» TaskJ, and (3) TaskA»TaskC»TaskH»TaskJ. In such a case, for each such workflow, a separate ratio may be calculated between the pendency time for the notification being evaluated and the cumulative pendency time for the successor tasks in that same workflow. In some implementations, such separate ratios may then be averaged together to determine a "successor pendency ratio" parameter 1938 (see table 1922 in FIG. 19B) that may be provided to the feature analysis engine 706 as one of the parameters 114. An example routine 2200 that may be employed to cycle through various tasks of various workflows to determine such a pendency time ratio with respect to successor tasks is described below in connection with FIG. 22. As discussed below in connection with the step 2208 of the routine 2200, in some implementations, the feature determination engine 704 may consider only those tasks in a workflow that are associated with generated notifications 106, 546 when determining the "successor pendency ratio" parameter 1938. This restriction may be accomplished, for example, by having the feature determination engine 704 identify for a given workflow, at the step 2208 of the routine 2200, only those successor tasks for which a "notification create time" entry 2104 has been made in the table 2102 shown in FIG. 21.

Referring still again to FIG. 19A, at a step 1920 of the routine 1004, the feature determination engine 704 may determine a metric that compares an amount of time the notification 106, 546 for which a collaboration priority score 104 has been requested has been pending to the cumulative pendency time(s) for notifications corresponding to any tasks (either predecessor or successor) in the same workflow(s), where each such pendency time corresponds either to amount of time that a notification has been pending in an activity feed 544 or to an amount of time that a notification remained pending before it was cleared from an activity feed 544.

As noted previously, in some implementations, the task indicated by the notification 106, 546 being evaluated may be included in each of several workflows. For example, with reference to the digraph 116 shown in FIG. 1B, TaskC is included in each of three different workflows, including (1) TaskA»TaskC»TaskF»TaskI, (2) TaskA»TaskC»TaskG» TaskJ, and (3) TaskA»TaskC»TaskH»TaskJ. In such a case, for each such workflow, a separate ratio may be calculated between the pendency time for the notification being evaluated and the cumulative pendency time for the other tasks in that same workflow. In some implementations, such separate ratios may then be averaged together to determine a "related pendency ratio" parameter 1940 (see table 1922 in FIG. 19B) that may be provided to the feature analysis engine 706 as one of the parameters 114. An example routine 2200 that may be employed to cycle through various tasks of various workflows to determine such a pendency time ratio with respect to tasks in the same workflow is described below in connection with FIG. 22. As discussed below in connection with the step 2208 of the routine 2200, in some implementations, the feature determination engine 704 may consider only those tasks in a workflow that are associated with generated notifications 106, 546 when determining the "related pendency ratio" parameter 1940. This restriction may be accomplished, for example, by having the feature determination engine 704 identify for a given workflow, at the step 2208 of the routine 2200, only those tasks for which a "notification create time" entry 2104 has been made in the table 2102 shown in FIG. 21.

Figure 22:
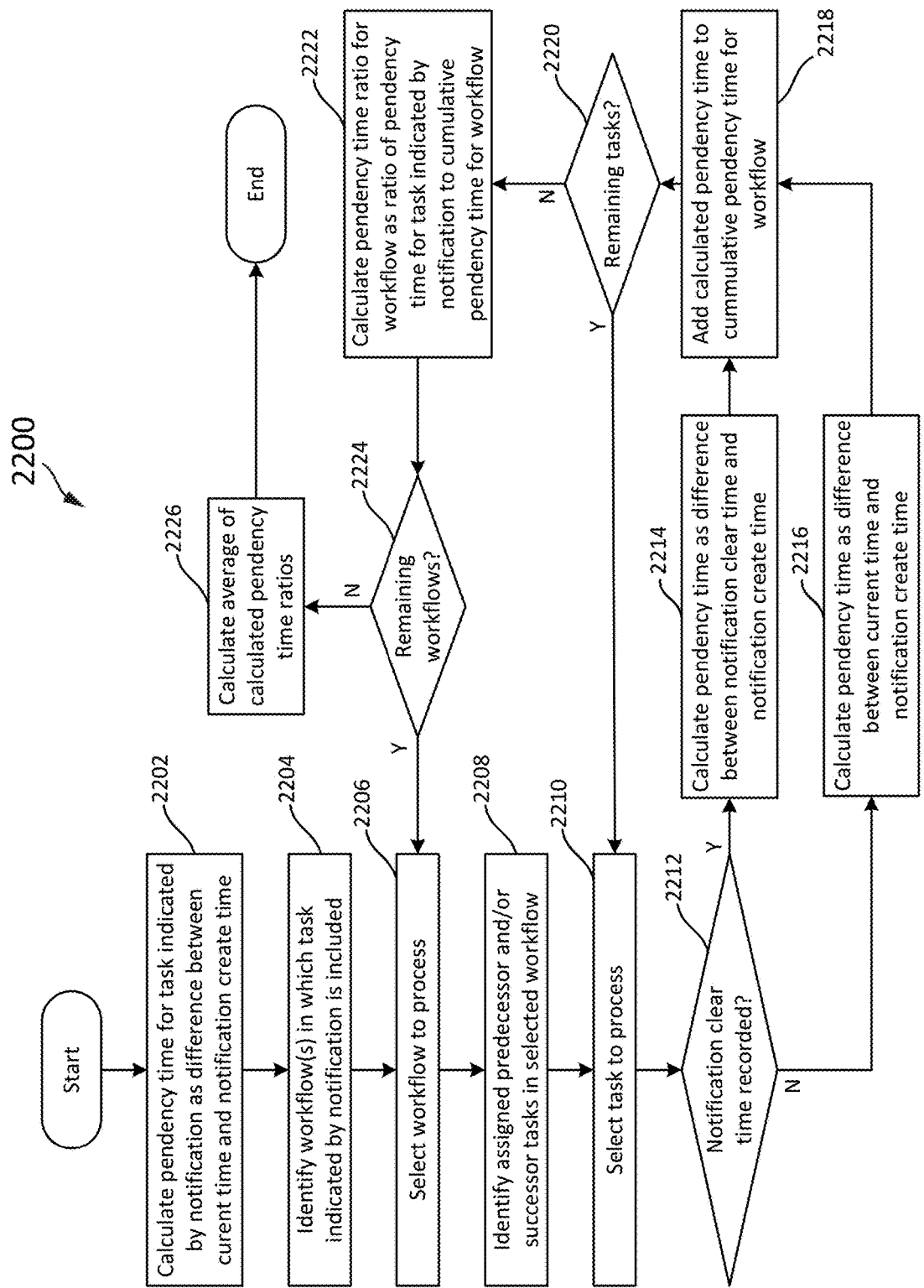
FIG. 22 is a flowchart showing an example routine that may be executed by the feature determination engine shown in FIG. 7 to determine various notification pendency ratios in connection with the final three steps of the routine shown in FIG. 19A.

FIG. 22 shows an example routine 2200 that may be executed by the feature determination engine 704 to determine the notification pendency ratios discussed above in connection with steps 1916, 1918, and 1920 of the routine 1004 shown in FIG. 19A. In some implementations, the only difference in the way the routine 2200 executes for the respective steps 1916, 1918, and 1920 relates to the types of tasks that are identified within respective workflows at the step 2208. In particular, for the step 1916, the feature determination engine 704 identifies only those "assigned" tasks, i.e., tasks for which a notification 106, 546 has been generated, within a workflow that are predecessors to the task indicated by the notification 106, 546 for which a collaboration priority score 104 has been requested; for the step 1918, the feature determination engine 704 identifies only those assigned tasks within a workflow that are successors to the task indicated by the notification 106, 546 for which a collaboration priority score 104 has been requested; and for the step 1920, the feature determination engine 704 identifies all assigned tasks within a workflow that have a dependency relationship with the task indicated by the notification 106, 546 for which a collaboration priority score 104 has been requested.

As shown in FIG. 22, at a step 2202, the feature determination engine 704 may calculate the pendency time for the task that is indicated by the notification 106, 546 for which a collaboration priority score has been requested. Such a pendency time may be calculated, for example, by determining a difference between the current time and the "notification create time" entry 2104 in the table 2102 (shown in FIG. 21) for that task. Such a calculated pendency time corresponds to the approximate amount of time that a notification corresponding to that task has remained pending in a user's activity feed 544.

At a step 2204 of the routine 2200, the feature determination engine 704 may identify the workflow(s) in which the task indicated by the notification 106, 546 under consideration is included. Examples of such workflows are described above in connection with the description of the steps 1916, 1918, and 1920 of the routine 1004 shown in FIG. 19A, with reference to the example digraph 116 shown in FIG. 1A.

At a step 2206 of the routine 2200, the feature determination engine 704 may select one of the workflows identified at the step 2204 for processing.

At a step 2208 of the routine 2200, the feature determination engine 704 may identify some or all of the tasks in the identified workflow for further processing. As noted above, in some implementations, the feature determination engine 704 may identify for further processing only "assigned" tasks, i.e., tasks for which notifications have been generated. In some implementations, any tasks that correspond to notifications having a "notification create time" entry 2104 in the table 2102 (shown in FIG. 21) may be deemed to have been "assigned." Further, as discussed above, the identification of assigned tasks at the step 2208 may additionally or alternatively involve identifying only predecessor tasks (per the step 1916 of the routine 1004 shown in FIG. 19), identifying only successor tasks (per the step 1918 of the routine 1004 shown in FIG. 19), or identifying all tasks that have any dependency relationship with the task under consideration (per the step 1920 of the routine 1004 shown in FIG. 19).

At a step 2210 of the routine 2200, the feature determination engine 704 may select one of the assigned tasks identified at the step 2208 for processing.

At a decision step 2212 of the routine 2200, the feature determination engine 704 may determine whether the table 2102 (shown in FIG. 21) includes a "notification clear time" entry 2106 for the task identified at the step 2210.

When the feature determination engine 704 determines, at the decision step 2212, that the table 2102 does include a "notification clear time" entry 2106 for the task identified at the step 2210, the routine 2200 may proceed to a step 2214, at which a pendency time for that task may be calculated as difference between the "notification clear time" entry 2106 and the "notification create time" entry 2104 for the task.

When the feature determination engine 704 determines, at the decision step 2212, that the table 2102 does not include a "notification clear time" entry 2106 for the task identified at the step 2210, the routine 2200 may instead proceed to a step 2216, at which a pendency time for that task may be calculated as difference between the current time and the "notification create time" entry 2104 for the task.

At a step 2218 of the routine 2200, the feature determination engine 704 may add the pendency time calculated at the step 2214 or 2216 to a cumulative pendency time being determined for the tasks of the workflow that were identified at the step 2208.

At a decision step 2220 of the routine 2200, the feature determination engine 704 may determine whether any of the tasks identified at the step 2208 remain to be processed.

When the feature determination engine 704 determines, at the decision step 2220, that at least one task identified at the step 2208 has not yet been processed, the routine 2200 may return to the step 2210, at which another one of the tasks identified at the step 2208 may be selected for processing.

When, on the other hand, the feature determination engine 704 determines, at the decision step 2220, that all of the tasks identified at the step 2208 have been processed, the routine 2200 may instead proceed to a step 2222, at which a pendency time ratio for the workflow selected at the step 2206 may be calculated. As indicated, in some implementations, such a ratio may be calculated as a ratio of the pendency time calculated at the step 2202 (i.e., the pendency time of the task indicated by the notification 106, 546 under consideration) to the cumulative pendency time for the workflow calculated at the step 2118.

At a decision step 2224 of the routine 2200, the feature determination engine 704 may determine whether any of the workflows identified at the step 2204 remain to be processed.

When the feature determination engine 704 determines, at the decision step 2224, that at least one workflow identified at the step 2204 has not yet been processed, the routine 2200 may return to the step 2206, at which another one of the workflows identified at the step 2204 may be selected for processing.

When, on the other hand, the feature determination engine 704 determines, at the decision step 2224, that all of the workflows identified at the step 2204 have been processed, the routine 2200 may instead proceed to a step 2226, at which an average value of the respective pendency time ratios calculated at the step 2222 for the different workflows identified at the step 2204 may be calculated.

The average value calculated at the step 2226 may then be used as one of the parameters 114 that the feature determination engine 704 provides to the feature analysis engine 706. In particular, for the step 1916 of the routine 1004 (shown in FIG. 19A), the average value calculated at the step 2226 may be used as a "predecessor pendency ratio" parameter 1936 (see table 1922 in FIG. 19B); for the step 1918 of the routine 1004 (shown in FIG. 19A), the average value calculated at the step 2226 may be used as a "successor pendency ratio" parameter 1938 (see table 1922 in FIG. 19B); and for the step 1920 of the routine 1004 (shown in FIG. 19A), the average value calculated at the step 2226 may be used as a "related pendency ratio" parameter 1940 (see table 1922 in FIG. 19B).

G. Example Implementations of Methods, Systems, and Computer-Readable Media in Accordance With the Present Disclosure The following paragraphs (M1) through (M23) describe examples of methods that may be implemented in accordance with the present disclosure.

(M1) A method may involve determining, by a computing system, that a plurality of notifications, including a first notification, is to be sent to a first client device, the first notification indicating a first task that is to be performed with respect to a resource accessible to the computing system; determining, by the computing system, that a second task has a dependency relationship with the first task; determining, by the computing system, at least one first parameter relating to the first task and at least one second parameter relating to the second task; determining, by the computing system and based at least in part on the at least one first parameter and the at least one second parameter, a first priority score corresponding to the first notification; and causing the plurality of notifications to be presented by the first client device in an order that is determined based at least in part on the first priority score.

(M2) A method may be performed as described in paragraph (M1), and may further involve determining, by the computing system, that the second task is to be performed by at least one individual other than a user of the first client device.

(M3) A method may be performed as described in paragraph (M1) or paragraph (M2), wherein the first notification may further include at least a first user interface element corresponding to a first action to be taken with respect to the first task.

(M4) A method may be performed as described in any of paragraphs (M1) through (M3), wherein determining that the second task the dependency relationship with the first task may involve receiving data from the resource indicating that the second task has the dependency relationship with the first task.

(M5) A method may be performed as described in any of paragraphs (M1) through (M4), and may further involve determining an importance value for the first task, the importance value indicating that the first task has been assigned a first priority level from among a plurality of predetermined task priority levels; and causing the at least one first parameter to include the importance value.

(M6) A method may be performed as described in any of paragraphs (M1) through (M5), and may further involve determining that the first task is of a first type; determining a preference value indicating a user's tendency to handle tasks of the first type prior to handling other types of tasks; and causing the at least one first parameter to include the preference value.

(M7) A method may be performed as described in any of paragraphs (M1) through (M6), and may further involve determining a time value representing a time cost estimate for the first task, the time cost estimate indicating an estimated time to complete the first task; and causing the at least one first parameter to include the time value.

(M8) A method may be performed as described in paragraph (M7), and may further involve determining that the first task is of a first type; determining a first stored value associated with an indicator of the first type of activity; determining, based at least in part on the first stored value, a first estimated time to complete the first task; and determining the time value based at least in part on the first estimated time.

(M9) A method may be performed as described in any of paragraphs (M1) through (M8), and may further involve determining a predecessor task value representing a number of tasks that are predecessors of the first task; and causing the at least one second parameter to include the predecessor task value.

(M10) A method may be performed as described in any of paragraphs (M1) through (M9), and may further involve determining a successor task value representing a number of tasks that are successors of the first task; and causing the at least one second parameter to include the successor task value.

(M11) A method may be performed as described in any of paragraphs (M1) through (M10), and may further involve determining a dependency relationship value representing a number of tasks that have a dependency relationship with the first task; and causing the at least one second parameter to include the dependency relationship value.

(M12) A method may be performed as described in any of paragraphs (M1) through (M11), and may further involve determining a predecessor task completion time value representing an amount of time taken and/or estimated to be taken to complete one or more tasks that are predecessors of the first task; and causing the at least one second parameter to include the predecessor task completion time value.

(M13) A method may be performed as described in paragraph (M12), and may further involve determining that the second task is of a second type; determining a stored value associated with an indicator of the second type of activity; determining, based at least in part on the stored value, a second estimated time to complete the second task; and determining the predecessor task completion time value based at least in part on the second estimated time.

(M14) A method may be performed as described in any of paragraphs (M1) through (M13), and may further involve determining a successor task completion time value representing an amount of time taken and/or estimated to be taken to complete one or more tasks that are successors of the first task; and causing the at least one second parameter to include the successor task completion time value.

(M15) A method may be performed as described in paragraph (M14), and may further involve determining that the second task is of a second type; determining a stored value associated with an indicator of the second type of activity; determining, based at least in part on the stored value, a second estimated time to complete the second task; and determining the successor task completion time value based at least in part on the second estimated time.

(M16) A method may be performed as described in any of paragraphs (M1) through (M15), and may further involve determining a related task completion time value representing an amount of time taken and/or estimated to be taken to complete one or more tasks that have a dependency relationship with the first task; and causing the at least one second parameter to include the related task completion time value.

(M17) A method may be performed as described in paragraph (M16), and may further involve determining that the second task is of a second type; determining a stored value associated with an indicator of the second type of activity; determining, based at least in part on the stored value, a second estimated time to complete the second task; and determining the related task completion time value based at least in part on the second estimated time.

(M18) A method may be performed as described in any of paragraphs (M1) through (M17), and may further involve determining a first workflow that includes at least the first task and the second task; determining a first pendency time for the first task; determining a second pendency time for the second task; determining at least one pendency ratio value based at least in part on the first pendency time and the second pendency time; and causing the at least one second parameter to include the at least one pendency ratio value.

(M19) A method may be performed as described in paragraph (M18), and may further involve causing a second notification to be sent to a second client device, the second notification indicating that the second task is to be performed with respect to the resource; wherein determining the first pendency time may involve determining a pendency time of the first notification, and determining the second pendency time may involve determining a pendency time of the second notification.

(M20) A method may be performed as described in paragraph (M18) or paragraph (M19), wherein determining the at least one pendency ratio value may involve determining a first ratio of the first pendency time to a cumulative pendency time of tasks that are predecessors of the first task in the first workflow.

(M21) A method may be performed as described in any of paragraphs (M18) through (M20), and may further involve determining a second workflow that includes at least the first task and a third task; and determining a third pendency time for the third task; wherein determining the at least one pendency ratio value may be further based at least in part on the third pendency time.

(M22) A method may be performed as described in any of paragraphs (M1) through (M21), wherein determining the first priority score may involve processing the at least one first parameter and the at least one second parameter with a trained machine learning model to determine the first priority score.

(M23) A method may be performed as described in paragraph (M22), and may further involve determining an order in which a user handled the plurality of notifications; determining, based at least in part on the order, an adjusted priority score for the first notification; and retraining the machine learning model using the at least one first parameter, the at least one second parameter, and the adjusted priority score.

The following paragraphs (S1) through (S23) describe examples of systems and devices that may be implemented in accordance with the present disclosure.

(S1) A system may comprise at least one processor and at least one computer-readable medium encoded with instructions which, when executed by the at least one processor, cause the system to determine that a plurality of notifications, including a first notification, is to be sent to a first client device, the first notification indicating a first task that is to be performed with respect to a resource accessible to the computing system; to determine that a second task has a dependency relationship with the first task; to determine at least one first parameter relating to the first task and at least one second parameter relating to the second task; to determine, based at least in part on the at least one first parameter and the at least one second parameter, a first priority score corresponding to the first notification; and to cause the plurality of notifications to be presented by the first client device in an order that is determined based at least in part on the first priority score.

(S2) A system may be configured as described in paragraph (S1), and the at least one computer-readable medium may be further encoded with additional instructions which, when executed by the at least one processor, further cause the system to determine that the second task is to be performed by at least one individual other than a user of the first client device.

(S3) A system may be configured as described in paragraph (S1) or paragraph (S2), and the at least one computer-readable medium may be further encoded with additional instructions which, when executed by the at least one processor, further cause the system to cause the first notification to include at least a first user interface element corresponding to a first action to be taken with respect to the first task.

(S4) A system may be configured as described in any of paragraphs (S1) through (S3), and the at least one computer-readable medium may be further encoded with additional instructions which, when executed by the at least one processor, further cause the system to determine that the second task the dependency relationship with the first task at least in part by receiving data from the resource indicating that the second task has the dependency relationship with the first task.

(S5) A system may be configured as described in any of paragraphs (S1) through (S4), and the at least one computer-readable medium may be further encoded with additional instructions which, when executed by the at least one processor, further cause the system to determine an importance value for the first task, the importance value indicating that the first task has been assigned a first priority level from among a plurality of predetermined task priority levels; and to cause the at least one first parameter to include the importance value.

(S6) A system may be configured as described in any of paragraphs (S1) through (S5), and the at least one computer-readable medium may be further encoded with additional instructions which, when executed by the at least one processor, further cause the system to determine that the first task is of a first type; to determine a preference value indicating a user's tendency to handle tasks of the first type prior to handling other types of tasks; and to cause the at least one first parameter to include the preference value.

(S7) A system may be configured as described in any of paragraphs (S1) through (S6), and the at least one computer-readable medium may be further encoded with additional instructions which, when executed by the at least one processor, further cause the system to determine a time value representing a time cost estimate for the first task, the time cost estimate indicating an estimated time to complete the first task; and to cause the at least one first parameter to include the time value.

(S8) A system may be configured as described in paragraph (S7), and the at least one computer-readable medium may be further encoded with additional instructions which, when executed by the at least one processor, further cause the system to determine that the first task is of a first type; to determine a first stored value associated with an indicator of the first type of activity; to determine, based at least in part on the first stored value, a first estimated time to complete the first task; and to determine the time value based at least in part on the first estimated time.

(S9) A system may be configured as described in any of paragraphs (S1) through (S8), and the at least one computer-readable medium may be further encoded with additional instructions which, when executed by the at least one processor, further cause the system to determine a predecessor task value representing a number of tasks that are predecessors of the first task; and to cause the at least one second parameter to include the predecessor task value.

(S10) A system may be configured as described in any of paragraphs (S1) through (S9), and the at least one computer-readable medium may be further encoded with additional instructions which, when executed by the at least one processor, further cause the system to determine a successor task value representing a number of tasks that are successors of the first task; and to cause the at least one second parameter to include the successor task value.

(S11) A system may be configured as described in any of paragraphs (S1) through (S10), and the at least one computer-readable medium may be further encoded with additional instructions which, when executed by the at least one processor, further cause the system to determine a dependency relationship value representing a number of tasks that have a dependency relationship with the first task; and to cause the at least one second parameter to include the dependency relationship value.

(S12) A system may be configured as described in any of paragraphs (S1) through (S11), and the at least one computer-readable medium may be further encoded with additional instructions which, when executed by the at least one processor, further cause the system to determine a predecessor task completion time value representing an amount of time taken and/or estimated to be taken to complete one or more tasks that are predecessors of the first task; and to cause the at least one second parameter to include the predecessor task completion time value.

(S13) A system may be configured as described in paragraph (S12), and the at least one computer-readable medium may be further encoded with additional instructions which, when executed by the at least one processor, further cause the system to determine that the second task is of a second type; to determine a stored value associated with an indicator of the second type of activity; to determine, based at least in part on the stored value, a second estimated time to complete the second task; and to determine the predecessor task completion time value based at least in part on the second estimated time.

(S14) A system may be configured as described in any of paragraphs (S1) through (S13), and the at least one computer-readable medium may be further encoded with additional instructions which, when executed by the at least one processor, further cause the system to determine a successor task completion time value representing an amount of time taken and/or estimated to be taken to complete one or more tasks that are successors of the first task; and to cause the at least one second parameter to include the successor task completion time value.

(S15) A system may be configured as described in paragraph (S14), and the at least one computer-readable medium may be further encoded with additional instructions which, when executed by the at least one processor, further cause the system to determine that the second task is of a second type; to determine a stored value associated with an indicator of the second type of activity; to determine, based at least in part on the stored value, a second estimated time to complete the second task; and to determine the successor task completion time value based at least in part on the second estimated time.

(S16) A system may be configured as described in any of paragraphs (S1) through (S15), and the at least one computer-readable medium may be further encoded with additional instructions which, when executed by the at least one processor, further cause the system to determine a related task completion time value representing an amount of time taken and/or estimated to be taken to complete one or more tasks that have a dependency relationship with the first task; and to cause the at least one second parameter to include the related task completion time value.

(S17) A system may be configured as described in paragraph (S16), and the at least one computer-readable medium may be further encoded with additional instructions which, when executed by the at least one processor, further cause the system to determine that the second task is of a second type; to determine a stored value associated with an indicator of the second type of activity; to determine, based at least in part on the stored value, a second estimated time to complete the second task; and to determine the related task completion time value based at least in part on the second estimated time.

(S18) A system may be configured as described in any of paragraphs (S1) through (S17), and the at least one computer-readable medium may be further encoded with additional instructions which, when executed by the at least one processor, further cause the system to determine a first workflow that includes at least the first task and the second task; to determine a first pendency time for the first task; to determine a second pendency time for the second task; t determine at least one pendency ratio value based at least in part on the first pendency time and the second pendency time; and to cause the at least one second parameter to include the at least one pendency ratio value.

(S19) A system may be configured as described in paragraph (S18), and the at least one computer-readable medium may be further encoded with additional instructions which, when executed by the at least one processor, further cause the system to cause a second notification to be sent to a second client device, the second notification indicating that the second task is to be performed with respect to the resource; to determine the first pendency time at least in part by determining a pendency time of the first notification; and to determine the second pendency time at least in part by determining a pendency time of the second notification, (S20) A system may be configured as described in paragraph (S18) or paragraph (S19), and the at least one computer-readable medium may be further encoded with additional instructions which, when executed by the at least one processor, further cause the system to determine the at least one pendency ratio value at least in part by determining a first ratio of the first pendency time to a cumulative pendency time of tasks that are predecessors of the first task in the first workflow.

(S21) A system may be configured as described in any of paragraphs (S18) through (S20), and the at least one computer-readable medium may be further encoded with additional instructions which, when executed by the at least one processor, further cause the system to determine a second workflow that includes at least the first task and a third task; to determine a third pendency time for the third task; and to determine the at least one pendency ratio value based at least in part on the third pendency time.

(S22) A system may be configured as described in any of paragraphs (S1) through (S21), and the at least one computer-readable medium may be further encoded with additional instructions which, when executed by the at least one processor, further cause the system to determine the first priority score at least in part by processing the at least one first parameter and the at least one second parameter with a trained machine learning model to determine the first priority score.

(S23) A system may be configured as described in paragraph (S22), and the at least one computer-readable medium may be further encoded with additional instructions which, when executed by the at least one processor, further cause the system to determine an order in which a user handled the plurality of notifications; to determine, based at least in part on the order, an adjusted priority score for the first notification; and to retrain the machine learning model using the at least one first parameter, the at least one second parameter, and the adjusted priority score.

The following paragraphs (CRM1) through (CRM23) describe examples of computer-readable media that may be implemented in accordance with the present disclosure.

(CRM1) At least one non-transitory, computer-readable medium may be encoded with instructions which, when executed by at least one processor of a computing system, cause the computing system to to determine that a plurality of notifications, including a first notification, is to be sent to a first client device, the first notification indicating a first task that is to be performed with respect to a resource accessible to the computing system; to determine that a second task has a dependency relationship with the first task; to determine at least one first parameter relating to the first task and at least one second parameter relating to the second task; to determine, based at least in part on the at least one first parameter and the at least one second parameter, a first priority score corresponding to the first notification; and to cause the plurality of notifications to be presented by the first client device in an order that is determined based at least in part on the first priority score.

(CRM2) At least one computer-readable medium may be configured as described in paragraph (CRM1), and may be further encoded with additional instructions which, when executed by the at least one processor, further cause the computing system to determine that the second task is to be performed by at least one individual other than a user of the first client device.

(CRM3) A system may be configured as described in paragraph (CRM1) or paragraph (CRM2), and may be further encoded with additional instructions which, when executed by the at least one processor, further cause the computing system to cause the first notification to include at least a first user interface element corresponding to a first action to be taken with respect to the first task.

(CRM4) At least one computer-readable medium may be configured as described in any of paragraphs (CRM1)

through (CRM3), and may be further encoded with additional instructions which, when executed by the at least one processor, further cause the computing system to determine that the second task the dependency relationship with the first task at least in part by receiving data from the resource indicating that the second task has the dependency relationship with the first task.

(CRM5) At least one computer-readable medium may be configured as described in any of paragraphs (CRM1) through (CRM4), and may be further encoded with additional instructions which, when executed by the at least one processor, further cause the computing system to determine an importance value for the first task, the importance value indicating that the first task has been assigned a first priority level from among a plurality of predetermined task priority levels; and to cause the at least one first parameter to include the importance value.

(CRM6) At least one computer-readable medium may be configured as described in any of paragraphs (CRM1) through (CRM5), and may be further encoded with additional instructions which, when executed by the at least one processor, further cause the computing system to determine that the first task is of a first type; to determine a preference value indicating a user's tendency to handle tasks of the first type prior to handling other types of tasks; and to cause the at least one first parameter to include the preference value.

(CRM7) At least one computer-readable medium may be configured as described in any of paragraphs (CRM1) through (CRM6), and may be further encoded with additional instructions which, when executed by the at least one processor, further cause the computing system to determine a time value representing a time cost estimate for the first task, the time cost estimate indicating an estimated time to complete the first task; and to cause the at least one first parameter to include the time value.

(CRM8) At least one computer-readable medium may be configured as described in paragraph (CRM7), and may be further encoded with additional instructions which, when executed by the at least one processor, further cause the computing system to determine that the first task is of a first type; to determine a first stored value associated with an indicator of the first type of activity; to determine, based at least in part on the first stored value, a first estimated time to complete the first task; and to determine the time value based at least in part on the first estimated time.

(CRM9) At least one computer-readable medium may be configured as described in any of paragraphs (CRM1) through (CRM8), and may be further encoded with additional instructions which, when executed by the at least one processor, further cause the computing system to determine a predecessor task value representing a number of tasks that are predecessors of the first task; and to cause the at least one second parameter to include the predecessor task value.

(CRM10) At least one computer-readable medium may be configured as described in any of paragraphs (CRM1) through (CRM9), and may be further encoded with additional instructions which, when executed by the at least one processor, further cause the computing system to determine a successor task value representing a number of tasks that are successors of the first task; and to cause the at least one second parameter to include the successor task value.

(CRM11) At least one computer-readable medium may be configured as described in any of paragraphs (CRM1) through (CRM10), and may be further encoded with additional instructions which, when executed by the at least one processor, further cause the computing system to determine a dependency relationship value representing a number of tasks that have a dependency relationship with the first task; and to cause the at least one second parameter to include the dependency relationship value.

(CRM12) At least one computer-readable medium may be configured as described in any of paragraphs (CRM1) through (CRM11), and may be further encoded with additional instructions which, when executed by the at least one processor, further cause the computing system to determine a predecessor task completion time value representing an amount of time taken and/or estimated to be taken to complete one or more tasks that are predecessors of the first task; and to cause the at least one second parameter to include the predecessor task completion time value.

(CRM13) At least one computer-readable medium may be configured as described in paragraph (CRM12), and may be further encoded with additional instructions which, when executed by the at least one processor, further cause the computing system to determine that the second task is of a second type; to determine a stored value associated with an indicator of the second type of activity; to determine, based at least in part on the stored value, a second estimated time to complete the second task; and to determine the predecessor task completion time value based at least in part on the second estimated time.

(CRM14) At least one computer-readable medium may be configured as described in any of paragraphs (CRM1) through (CRM13), and may be further encoded with additional instructions which, when executed by the at least one processor, further cause the computing system to determine a successor task completion time value representing an amount of time taken and/or estimated to be taken to complete one or more tasks that are successors of the first task; and to cause the at least one second parameter to include the successor task completion time value.

(CRM15) At least one computer-readable medium may be configured as described in paragraph (CRM14), and may be further encoded with additional instructions which, when executed by the at least one processor, further cause the computing system to determine that the second task is of a second type; to determine a stored value associated with an indicator of the second type of activity; to determine, based at least in part on the stored value, a second estimated time to complete the second task; and to determine the successor task completion time value based at least in part on the second estimated time.

(CRM16) At least one computer-readable medium may be configured as described in any of paragraphs (CRM1) through (CRM15), and may be further encoded with additional instructions which, when executed by the at least one processor, further cause the computing system to determine a related task completion time value representing an amount of time taken and/or estimated to be taken to complete one or more tasks that have a dependency relationship with the first task; and to cause the at least one second parameter to include the related task completion time value.

(CRM17) At least one computer-readable medium may be configured as described in paragraph (CRM16), and may be further encoded with additional instructions which, when executed by the at least one processor, further cause the computing system to determine that the second task is of a second type; to determine a stored value associated with an indicator of the second type of activity; to determine, based at least in part on the stored value, a second estimated time to complete the second task; and to determine the related task completion time value based at least in part on the second estimated time.

(CRM18) At least one computer-readable medium may be configured as described in any of paragraphs (CRM1) through (CRM17), and may be further encoded with additional instructions which, when executed by the at least one processor, further cause the computing system to determine a first workflow that includes at least the first task and the second task; to determine a first pendency time for the first task; to determine a second pendency time for the second task; t determine at least one pendency ratio value based at least in part on the first pendency time and the second pendency time; and to cause the at least one second parameter to include the at least one pendency ratio value.

(CRM19) At least one computer-readable medium may be configured as described in paragraph (CRM18), and may be further encoded with additional instructions which, when executed by the at least one processor, further cause the computing system to cause a second notification to be sent to a second client device, the second notification indicating that the second task is to be performed with respect to the resource; to determine the first pendency time at least in part by determining a pendency time of the first notification; and to determine the second pendency time at least in part by determining a pendency time of the second notification, (CRM20) At least one computer-readable medium may be configured as described in paragraph (CRM18) or paragraph (CRM19), and may be further encoded with additional instructions which, when executed by the at least one processor, further cause the computing system to determine the at least one pendency ratio value at least in part by determining a first ratio of the first pendency time to a cumulative pendency time of tasks that are predecessors of the first task in the first workflow.

(CRM21) At least one computer-readable medium may be configured as described in any of paragraphs (CRM18) through (CRM20), and may be further encoded with additional instructions which, when executed by the at least one processor, further cause the computing system to determine a second workflow that includes at least the first task and a third task; to determine a third pendency time for the third task; and to determine the at least one pendency ratio value based at least in part on the third pendency time.

(CRM22) At least one computer-readable medium may be configured as described in any of paragraphs (CRM1) through (CRM21), and may be further encoded with additional instructions which, when executed by the at least one processor, further cause the computing system to determine the first priority score at least in part by processing the at least one first parameter and the at least one second parameter with a trained machine learning model to determine the first priority score.

(CRM23) At least one computer-readable medium may be configured as described in paragraph (CRM22), and may be further encoded with additional instructions which, when executed by the at least one processor, further cause the computing system to determine an order in which a user handled the plurality of notifications; to determine, based at least in part on the order, an adjusted priority score for the first notification; and to retrain the machine learning model using the at least one first parameter, the at least one second parameter, and the adjusted priority score.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   determining, by a computing system, that a plurality of notifications, including a first notification, is to be provided to a first user, the first notification indicating a first task that is to be performed with respect to a resource accessible to the computing system;
   determining, by the computing system, that a second task has a dependency relationship with the first task;
   determining, by the computing system, at least one first parameter relating to the first task and at least one second parameter relating to the second task;
   after determining that the first notification is to be provided to the first user, determining, by the computing system and based at least in part on the at least one first parameter and the at least one second parameter, a first priority score corresponding to the first notification; and
   causing the plurality of notifications to be presented by a first client device operated by the first user in an order that is determined based at least in part on the first priority score.

2. The method of claim 1, wherein the first notification further includes at least a first user interface element corresponding to a first action to be taken with respect to the first task.

3. The method of claim 1, further comprising:
   determining a successor task value representing a number of tasks that are successors of the first task; and
   causing the at least one second parameter to include the successor task value.

4. The method of claim 1, further comprising:
determining a predecessor task completion time value representing an amount of time taken and/or estimated to be taken to complete one or more tasks that are predecessors of the first task; and
causing the at least one second parameter to include the predecessor task completion time value.

5. The method of claim 1, further comprising:
determining a successor task completion time value representing an amount of time taken and/or estimated to be taken to complete one or more tasks that are successors of the first task; and
causing the at least one second parameter to include the successor task completion time value.

6. The method of claim 5, further comprising:
determining that the second task is of a second type;
determining a stored value associated with an indicator of the second type of activity;
determining, based at least in part on the stored value, a second estimated time to complete the second task; and
determining the successor task completion time value based at least in part on the second estimated time.

7. The method of claim 1, further comprising:
determining a first workflow that includes at least the first task and the second task;
determining a first pendency time for the first task;
determining a second pendency time for the second task;
determining at least one pendency ratio value based at least in part on the first pendency time and the second pendency time; and
causing the at least one second parameter to include the at least one pendency ratio value.

8. The method of claim 7, further comprising:
determining a second workflow that includes at least the first task and a third task; and
determining a third pendency time for the third task;
wherein determining the at least one pendency ratio value is further based at least in part on the third pendency time.

9. The method of claim 1, wherein determining the first priority score further comprises:
processing the at least one first parameter and the at least one second parameter with a trained machine learning model to determine the first priority score.

10. The method of claim 9, further comprising:
determining an order in which a user handled the plurality of notifications;
determining, based at least in part on the order, an adjusted priority score for the first notification; and
retraining the machine learning model using the at least one first parameter, the at least one second parameter, and the adjusted priority score.

11. A system, comprising:
at least one processor; and
at least one computer-readable medium encoded with instructions which, when executed by the at least one processor, cause the system to:
determine that a plurality of notifications, including a first notification, is to be provided to a first user, the first notification indicating a first task that is to be performed with respect to a resource accessible to the system,
determine that a second task has a dependency relationship with the first task,
determine at least one first parameter relating to the first task and at least one second parameter relating to the second task,
after determining that the first notification is to be provided to the first user, determine, based at least in part on the at least one first parameter and the at least one second parameter, a first priority score corresponding to the first notification, and
cause the plurality of notifications to be presented by a first client device operated by the first user in an order that is determined based at least in part on the first priority score.

12. The system of claim 11, wherein the at least one computer-readable medium is further encoded with additional instructions which, when executed by the at least one processor, further cause the system to:
determine a successor task value representing a number of tasks that are successors of the first task; and
cause the at least one second parameter to include the successor task value.

13. The system of claim 11, wherein the at least one computer-readable medium is further encoded with additional instructions which, when executed by the at least one processor, further cause the system to:
determine a predecessor task completion time value representing an amount of time taken and/or estimated to be taken to complete one or more tasks that are predecessors of the first task; and
cause the at least one second parameter to include the predecessor task completion time value.

14. The system of claim 11, wherein the at least one computer-readable medium is further encoded with additional instructions which, when executed by the at least one processor, further cause the system to:
determine a successor task completion time value representing an amount of time taken and/or estimated to be taken to complete one or more tasks that are successors of the first task; and
cause the at least one second parameter to include the successor task completion time value.

15. The system of claim 14, wherein the at least one computer-readable medium is further encoded with additional instructions which, when executed by the at least one processor, further cause the system to:
determine that the second task is of a second type;
determine a stored value associated with an indicator of the second type of activity;
determine, based at least in part on the stored value, a second estimated time to complete the second task; and
determine the successor task completion time value based at least in part on the second estimated time.

16. The system of claim 11, wherein the at least one computer-readable medium is further encoded with additional instructions which, when executed by the at least one processor, further cause the system to:
determine a first workflow that includes at least the first task and the second task;
determine a first pendency time for the first task;
determine a second pendency time for the second task;
determine at least one pendency ratio value based at least in part on the first pendency time and the second pendency time; and
cause the at least one second parameter to include the at least one pendency ratio value.

17. The system of claim 16, wherein the at least one computer-readable medium is further encoded with additional instructions which, when executed by the at least one processor, further cause the system to:
determine a second workflow that includes at least the first task and a third task;

determine a third pendency time for the third task; and determine the at least one pendency ratio value based at least in part on the third pendency time.

18. The system of claim 11, wherein the at least one computer-readable medium is further encoded with additional instructions which, when executed by the at least one processor, further cause the system to:

determine the first priority score at least in part by processing the at least one first parameter and the at least one second parameter with a trained machine learning model to determine the first priority score.

19. The system of claim 18, wherein the at least one computer-readable medium is further encoded with additional instructions which, when executed by the at least one processor, further cause the system to:

determine an order in which a user handled the plurality of notifications;

determine, based at least in part on the order, an adjusted priority score for the first notification; and retrain the machine learning model using the at least one first parameter, the at least one second parameter, and the adjusted priority score.

20. At least one non-transitory computer-readable medium encoded with instructions which, when executed by at least one processor of a computing system, cause the computing system to:

determine that a plurality of notifications, including a first notification, is to be provided to a first user, the first notification indicating a first task that is to be performed with respect to a resource accessible to the computing system;

determine that a second task has a dependency relationship with the first task;

determine at least one first parameter relating to the first task and at least one second parameter relating to the second task;

after determining that the first notification is to be provided to the first user, determine, based at least in part on the at least one first parameter and the at least one second parameter, a first priority score corresponding to the first notification; and cause the plurality of notifications to be presented by a first client device operated by the first user in an order that is determined based at least in part on the first priority score.

* * * * *